United States Patent [19]

Ohtani et al.

[11] Patent Number: 4,820,778

[45] Date of Patent: Apr. 11, 1989

[54] RANDOM COPOLYMER CONTAINING HEXAGONAL IMIDE UNITS, A PROCESS FOR PRODUCING THE SAME, AND AN OPTICAL DISC SUBSTRATE MADE OF THE RANDOM COPOLYMER

[75] Inventors: Ikuji Ohtani, Yokohama; Akihiro Watanabe, Shinagawa; Akihiro Wada, Inagi; Rin-ichi Kakuta, Tokyo, all of Japan

[73] Assignee: Asahi Kasei Kokyo Kabushiki Kaisha, Osaka, Japan

[21] Appl. No.: 21,267

[22] Filed: Mar. 3, 1987

[30] Foreign Application Priority Data

Dec. 25, 1986 [JP] Japan .................... 61-308042
Dec. 25, 1986 [JP] Japan .................... 61-308043

[51] Int. Cl.$^4$ .................... C08F 8/32
[52] U.S. Cl. .................... 525/329.9; 525/330.5; 525/380
[58] Field of Search .................... 525/329.9, 330.4

[56] References Cited

U.S. PATENT DOCUMENTS 4,246,374  1/1981  Kipchik .................... 525/378

FOREIGN PATENT DOCUMENTS 0076691  4/1983  European Pat. Off. .
2101139  1/1983  United Kingdom .

Primary Examiner—Joseph Schofer
Assistant Examiner—Bernard Lipman
Attorney, Agent, or Firm—Birch, Stewart, Kolasch and Birch

[57] ABSTRACT

A novel random copolymer containing, in specific ratios, methyl methacrylate units, aromatic vinyl compound units, methacrylic acid units, hexagonal anhydride units and hexagonal imide units of the formula

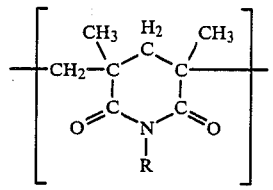

has been found to have excellent optical properties, mechanical strength, heat distortion resistance, heat decomposition resistance and oil resistance, and have low water absorption. The copolymer can advantageously be employed as a material for parts of light electric apparatus, engineering plastics, lenses, optical fiber cables, and is especially useful as a material for a substrate of optical discs.

19 Claims, 1 Drawing Sheet

RANDOM COPOLYMER CONTAINING HEXAGONAL IMIDE UNITS, A PROCESS FOR PRODUCING THE SAME, AND AN OPTICAL DISC SUBSTRATE MADE OF THE RANDOM COPOLYMER

BACKGROUND OF THE INVENTION

1. Field Of The Invention

The present invention relates to a novel random copolymer containing hexagonal imide units, a process for the preparation thereof. This copolymer and is useful as a substrate for an optical disc. More particularly, the present invention is concerned with a thermoplastic random copolymer which is colorless and transparent as well as having excellent heat distortion resistance, heat decomposition resistance, mechanical strength and oil resistance, and hence can be suitably employed as parts for light electric apparatus, engineering plastics, lenses, optical fiber cables, etc. Further, the present invention is concerned with a process for the preparation of a thermoplastic random copolymer. Yet further the present invention is concerned with a substrate for an optical disc, such as a digital audio disc, a video disc, a disc which is capable of being directly read after recording and the like. The optical disc substrate is especially suited for a high-density information recording medium for use in a recording and playback apparatus. This apparatus converts analogue information into digital information and records the digital information in a recording medium at a high packing density by means of a laser beam, and which consequently provides substantial convenience and advantage. Hence this apparatus has become the object of public attention.

2. Discussion Of Related Art

In the field of parts for light electric apparatus, engineering plastics, optical fiber cables, optical disc, etc., there is a strong and increasing demand for resin materials which are colorless and transparent as well as having excellent heat distortion resistance and other desirable physical properties.

A polycarbonate resin is colorless, its transparency is good and it has excellent heat distortion resistance. However, even though the transparency of this resin is good, its transparency is still insufficient. Thus, it is not employable as a material in many fields, especially those in which high transparency is required.

Polymethyl methacrylate (hereinafter, often abbreviated as PMMA) is pre-eminent in colorlessness and transparency as compared to other thermoplastic polymer resins. However, this resin is deficient in heat distortion resistance and in heat decomposition resistance.

Heretofore, there have been various proposals for improving the heat stability of PMMA while maintaining the other excellent properties thereof such as optical characteristics.

In one proposal, methyl methacrylate (hereinafter, often abbreviated as MMA) monomer is copolymerized with a comonomer. Examples of such comonomers include unsaturated dicarboxylic anhydrides, e.g. maleic anhydride; aromatic vinyl compounds, e.g. α-methylstyrene; maleimide derivatives, e.g. N-phenylmaleimide and N-o-chlorophenylmaleimide. However, this proposal has a serious drawback in that when an unsaturated dicarboxylic anhydride or an aromatic vinyl compound is used as a comonomer, the copolymer obtained is still characterized with an insufficient degree of heat stability and thus it would readily decompose in a molding step at 250° to 280° C. When N-phenylmaleimide or N-o-chlorophenylmaleimide is used as a comonomer, the copolymer obtained is undesirable in that it is likely to be discolored.

In a proposal previously made by the present inventors, hexagonal anhydride units of the formula

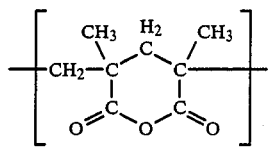

are formed in the molecules of a copolymer obtained from MMA, styrene and at least one member selected from methacrylic acid and t-butyl methacrylate. The copolymer thus obtained has excellent heat distortion resistance and heat decomposition resistance. The above-mentioned hexagonal anhydride units are formed by heat-treating the copolymer under reduced pressure. In the heat treatment of the copolymer, in the case in which the copolymer is obtained from MMA, styrene and methacrylic acid, the following two kinds of hexagonal anhydride unit-forming reactions occur: (1) a dehydration reaction between two adjacent methacrylic acid units, and (2) a reaction between a methacrylic acid unit and the adjacent MMA unit being accompanied by the elimination of methanol. At the heat treatment of the copolymer, when the copolymer is obtained from MMA, styrene and t-butyl methacrylate (hereinafter, often abbreviated as t-BMA), the following two-stage hexagonal anhydride unit-forming reaction occurs: (3) a reaction in a t-BMA unit being accompanied by the elimination of isobutene and the formation of a methacrylic acid unit and the subsequent reaction of the thus formed methacrylic acid units would occur in the same manner as described with respect to reactions (1) and (2) mentioned above.

In regard to above reactions (1) to (3), reactions (1) and (3) proceeded smoothly (D.H. Grant and N. Grassie, Polymer 1960, 1(2), 125). However, reaction (2) is disadvantageously time-consuming as compared with reactions (1) and (3). Therefore, it is difficult to practice the method by the use of conventional vent extruders such as those disclosed in European Patent Application Publication No. 0 076 691.

In order to eliminate the above problem in production, the present inventors further proposed a commercially advantageous method for producing a polymer containing MMA units and hexagonal anhydride units. In this method, methacrylic acid and/or t-BMA is copolymerized with MMA by continuous bulk polymerization or continuous solution polymerization, and, subsequently, the copolymer produced is continuously heat-treated at 200° to 300° C. under reduced pressure for 10 minutes or more. This method is advantageous from the viewpoint of commercial production. However, the copolymer obtained by this method is deficient in heat distortion resistance and heat decomposition resistance.

Therefore, an attempt has been made to increase the glass transition point of the polymer containing MMA units so as to provide a polymer having excellent heat distortion resistance and would be usable under high temperature conditions.

As to polymers with improved heat distortion resistance and heat decomposition resistance, there have been proposed various polymers having hexagonal imide units of the formula

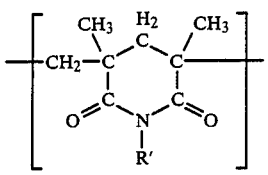

wherein R' is a hydrogen atom, an alkyl group, etc.

U.S. Pat. No. 4,246,374 discloses a method in which a polymer containing at least 80 wt % MMA units is reacted with ammonia or a primary amine in an extruder to convert the polymer to one which contains hexagonal imide units. However, this method requires a high temperature in an extruder, the temperature being in the range of from 300° to 375° C. Due to the high temperature, the extruded polymer resin is discolored to a yellow color. Although it remains transparent, it is still not usable as a material which is required to be not only colorless but also transparent. Further, the water absorption of the polymer obtained by this method is undesirably high. Moreover, the molecular weight of the polymer is undesirable in that it is likely to be lowered during the reaction with ammonia or a primary amine, leading to a lowering of the mechanical strength of the polymer.

European Patent Application Publication No. 0 076 691 discloses a method in which a copolymer containing at least 50% by weight, preferably 80 to 90% by weight, of units derived from acrylic acid and/or methacrylic acid, 5 to 20% by weight of styrene units and 1 to 10% by weight of MMA units is introduced into an extruder and heat-treated to form hexagonal anhydride units in the molecules of the copolymer, and the thus modified copolymer is then introduced into another extruder and reacted with ammonia or a primary amine to convert part or all of the hexagonal anhydride units in the molecules of the copolymer to hexagonal imide units. As is apparent from the above, the copolymer to be modified by the method contains acrylic acid units or methacrylic acid units in an amount as large as 50% or more and MMA units in an amount as small as 1 to 10%. Therefore, the modified copolymer produced by the method contains more than 50% by weight of hexagonal anhydride and/or hexagonal imide units. Due to such a high proportion of hexagonal units, the copolymer has excellent heat distortion resistance but its water absorption is undesirably high. Further, the melt-flow properties of the copolymer are poor, which leads to poor molding characteristics. The poor melt-flow properties can be improved by lowering the molecular weight of the copolymer. However, the lowered moleculer weight leads to a low mechanical strength of the copolymer. Therefore, the use of this copolymer as a molding material is undesirably limited.

UK Patent Application Publication No. GB 2 101 139 A discloses a method in which a molten methacrylate or acrylate polymer is continuously imidized in a tubular reactor. This method is only a modification of the above-mentioned method disclosed in U.S. Pat. No. 4,246,374, and the polymer obtained by this method is defective in that the water absorption of the polymer is high.

On the other hand, in the field of optical discs, there have been proposed various polymers for use as materials for substrates for optical discs.

An "optical disc" used herein relates to an information disc which is read optically in reflection, and includes for example, a digital audio disc (DAD), a video disc (VD), a so-called direct read after write (DRAW) disc and a so-called erasable direct read after write (E-DRAW) disc.

In a DAD, audio information which has been finely divided into signals and converted into a binary number system of "0" and "1" is recorded, on a metal layer capable of reflecting a laser beam, as a relief structure having a crenellated profile of areas situated alternately at a higher and a lower level (information bits) sometimes termed blocks and pits. The relief structure is read by means of a laser beam, and the signals of the laser beam, according to the binary number system, are converted into electrical signals and then played back as sound. In general, such a disc having a relief structure of a metal layer capable of reflecting a laser beam is obtained by molding a transparent resin into a disc having a relief structure and forming on the relief structure surface a metal layer by vacuum evaporation or the like.

Image information can likewise be recorded as a relief structure on a metal layer capable of reflecting a laser beam to give a VD.

Computer programs and data can also be recorded on an optical disc as relief structures to give an optical disc which is usable as an information disc of computer programs and data. Discs such as information discs for computers or a disc which is capable of being directly read after writing, or recording, (DRAW disc), are especially attracting attention. Further, an optical disc which is capable of being written on and erased [erasable direct read after write disc (E-DRAW disc)]is now being developed. In the field of DRAW discs, there are employed various types of recording layers. Examples of such recording layers include (1) a layer in which holes are formed by irradiation of a laser beam, (2) a layer in which formation of bubbles by irradiation of a laser beam is utilized, and (3) a layer in which the magnetic direction is changed by irradiation of a laser beam. The recording layer of the above type (3) is usable for E-DRAW discs.

For reading the relief structure in the above mentioned various optical discs by means of a laser beam, the laser beam interference, which is caused by the phase difference between laser beam directly incident on a detector and a laser beam traversing the substrate and reaching the detector, must be detected. Therefore, the resin to be used as the material for a substrate for optical discs must satisfy the following requirements:

(1) the resin must have a high laser beam transmission;

(2) after the resin has been molded into a disc, the orientation of the molecules in the resin must be small so that the double refraction of the laser beam is small;

(3) after the resin has been molded into a disc, the refraction index of the resin must not vary over the disc;

(4) the resin must not contain contaminants;

(5) the resin must have good heat distortion resistance;

(6) the resin must be susceptible to good vacuum evaporation of a metal;

(7) the resin must have good molding properties and can be molded into a disc with sharp pit pattern;

(8) the resin must have good adhesion to a recording layer, (9) after the resin has been molded into a disc, the thickness must be uniform over the disc; and

(10) after the resin has been molded into a disc, the disc must be stable in respect to freedom from warp with the passing of time.

In addition to the above requirements, the resin should not contain impurities such as the polymerization solvent, and should not hydrolyze.

Heretofore, polymethyl methacrylate (PMMA) has been used as a material for substrates for optical discs. However, the water absorption of PMMA is high and, hence, an optical disc utilizing PMMA as the material for its substrate would in time become warped, due to the absorption of water by the substrate. In order to eliminate this drawback, there has been proposed an optical disc in which a substrate made from a PMMA resin is covered with a resin having good barrier properties to water, such as polyvinylidene chloride resin. However, for preparing such a disc, a troublesome step is required.

A polycarbonate resin has also been used as a material for a substrate for optical discs. However, the substrate made of this resin is defective in that it inevitably contains impurities such as chromium and dichloromethane which deteriorate the recording layer. The contamination of the substrate with chromium is caused during the molding of the resin which is usually conducted at high temperatures. The contamination of the substrate with dichloromethane is caused by the dichloromethane used as the polymerization solvent which has not been removed. Further, the substrate made of the resin would in time become hydrolyzed, which would lead to the deterioration of the adhesion of the substrate of the recording layer.

Further, there have been proposed optical discs in which a copolymer of methyl methacrylate and styrene (methyl methacrylate/styrene =60/40 or 30/70 by weight) is used as the material for substrates (see Japanese Patent Application Laid-Open Specifications Nos. 57-33446/1982 and 57-162135/1982). However, the substrates are deficient in heat distortion resistance and the double refraction thereof is disadvantageously high.

The present inventors previously proposed an optical disc substrate made of a resin comprising a copolymer of a methacrylic acid ester and a monoalkenyl aromatic compound (see Japanese Patent Application Laid-Open Specification No. 58-88843/1983). This substrate substantially satisfies standard requirements for DADs having a diameter of 120 mm and a thickness of 1.2 mm. However, it is difficult for this substrate to satisfy standard requirements for DRAW discs having a diameter of 300 mm and a thickness of 1.2 mm. Illustratively stated, due to the increased diameter of DRAW discs, the length in which a molten resin, when subjected to injection molding, flows from the center portion to the edge portion of the mold becomes large as compared with the case of the molding of DADs, so that the orientation of the molecules is likely to occur, leading to an increase in double refraction. Therefore, it is difficult for the substrate to have a double refraction as small as 40 nm or less, which is required as the standard value for DRAW discs, and further as small as 20 nm or less, which is required as the standard value for E-DRAW discs.

The present inventors further proposed an optical disc substrate made of a resin comprising a copolymer which is obtained by copolymerizing 40 to 70 parts by weight of methyl methacrylate, 5 to 20 parts by weight of a methacrylic acid ester with a saturated aliphatic monohydric alcohol having 3 to 6 carbon atoms, and 25 to 40 parts by weight of monoalkenyl aromatic compound, and which has a solution viscosity of 3 to 10 cps as measured at 25° C. with respect to a 10% solution of the copolymer in methyl ethyl ketone and a double refraction of 100 nm or less (see Japanese Patent Application Laid-Open Specification No. 59-108012/1984). This substrate is satisfactory in double refraction and water absorption. However, this substrate is deficient in the heat resistance required when forming a recording or reflection layer on the substrate by sputtering or the like, and is defective in that creep is likely to occur when a disc using the substrate is leaned and stored for a long period of time under warm conditions.

Therefore, there has been a strong demand in the field of an optical disc for resin materials which satisfy the above-mentioned requirements (1) to (10).

SUMMARY OF THE INVENTION

In view of the current situation as described above, the present inventors have conducted intensive studies related to the development of a polymer which has all of the following properties, excellent heat distortion resistance, heat decomposition resistance, colorlessness, transparency, molding properties and moisture resistance, and is usable as a material for a substrate of optical discs. As a result of these studies, they have unexpectedly found that a polymer with improved physical and optical properties can be obtained by treating a copolymer obtained from MMA, an aromatic vinyl compound and methacrylic acid and/or tBMA to form hexagonal anhydride units in the copolymer and then converting part or all of the hexagonal anhydride units to hexagonal imide units of the formula

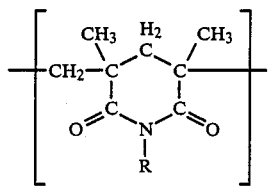

wherein R is a hydrogen atom, an alkyl group, etc. The present invention is based on this novel finding.

Accordingly, it is an object of the present invention to provide a novel random copolymer having excellent physical and optical properties, such as heat distortion resistance, heat decomposition resistance, mechanical strength, moisture resistance (low water absorption), molding properties, colorlessness and transparency.

It is another object of the present invention to provide a process for the preparation of the novel random copolymer.

It is a further object of the present invention to provide a substrate for an optical disc which is made of the novel random copolymer.

The foregoing and other objects, features and advantages of the present invention will be apparent from the following detailed description and appended claims taken in connection with the accompanying drawing in which:

BRIEF DESCRIPTION OF THE DRAWINGS

In FIGS. 1 and 2, like parts or portions are designated by like numerals.

DETAILED DESCRIPTION OF THE INVENTION

Figure 1:
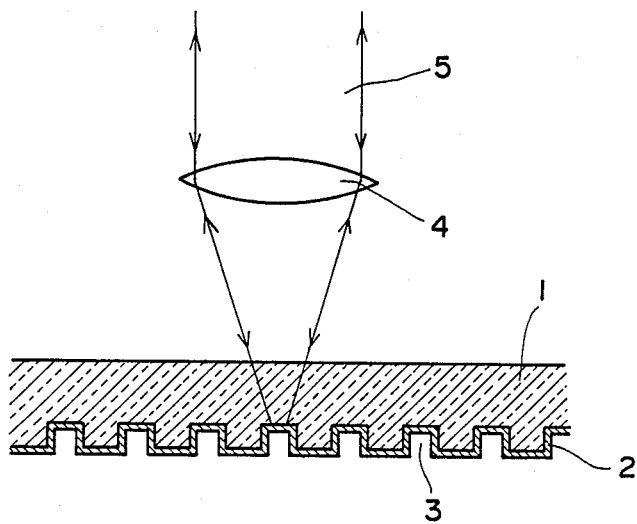
FIG. 1 is a diagrammatic cross-sectional view illustrating the reading operation of an optical disc in which the random copolymer of the present invention is used as a material of the substrate for the optical disc.

In one aspect of the present invention, there is provided a random copolymer comprising:

(A) 29 to 92% by weight, based on the copolymer, of methyl methacrylate units, (B) 5 to 67% by weight, based on the copolymer, of aromatic vinyl compound units of the formula (I)

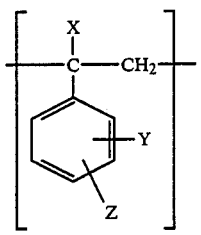

(I)

wherein X is selected from the group consisting of a hydrogen atom and a methyl group, and Y ad Z are independently selected from the group consisting of a hydrogen atom, an alkyl group having 1 to 4 carbon atoms, and a chlorine atom, (C) 1 to 10% by weight, based on the copolymer, of methacrylic acid units, (D) 0 to 48% by weight, based on the copolymer, of hexagonal anhydride units of the formula (II)

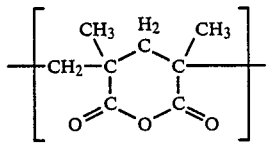

(II)

and (E) 2 to 50% by weight, based on the copolymer, of hexagonal imide units of the formula (III)

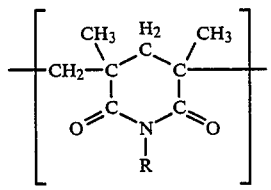

(III)

wherein R is selected from the group consisting of a hydrogen atom and $R^1$ in which $R^1$ is selected from the group consisting of an alkyl group having 1 to 10 carbon atoms, a cycloalkyl group having 5 to 12 carbon atoms, an aralkyl group having 7 to 22 carbon atoms and an aryl group having 6 to 12 carbon atoms, the sum of the units (A) and (B) and the sum of said units (D) and (E) being respectively in the ranges of 49 to 97% by weight and 2 to 50% by weight based on the copolymer, wherein the random copolymer has a reduced viscosity ($\eta sp/C$) of 0.15 to 2 dl/g as measured at 25° C. with respect to 0.5 dl of a solution of 0.15 g of the random copolymer in chloroform.

In the random copolymer of the present invention, methyl methacrylate (MMA) units (A) are contained in an amount of 29 to 92% by weight, preferably 29 to 85% by weight, based on the copolymer. The MMA units contribute mainly to improved mechanical strength and oil resistance of the copolymer. If the proportion of MMA units (A) is lower than 29% by weight, the mechanical strength of the copolymer is decreased. If the proportion is more than 92% by weight, the meltflow properties of the copolymer become poor, leading to a decrease in molding characteristics, and further, the heat decomposition resistance of the copolymer becomes poor.

The aromatic vinyl compound units (B) of the formula (I) are contained in the random copolymer in an amount of 5 to 67% by weight, preferably 5 to 56% by weight, based on the copolymer. The aromatic vinyl compound units (B) contribute mainly to improved heat decomposition resistance and melt-flow properties of the copolymer, and to lower the water absorption property of the copolymer. The good melt-flow properties of the copolymer leads to improvement in molding characteristics, and the low water absorption property leads to high dimensional stability of molded products. If the proportion of the aromatic vinyl compound units (B) is less than 5% by weight, the heat decomposition resistance becomes poor, the water absorption becomes disadvantageously high and the melt-flow properties become poor. If the proportion is more than 67% by weight, the mechanical strength and oil resistance are undesirably lowered.

As the aromatic vinyl compound units (B), there may be mentioned for example, monomer units derived from styrene, α-methylstyrene, p-methylstyrene, 2,4-dimethylstyrene, p-tert-butylstyrene, p-chlorostyrene and combinations thereof. Among the above units, a styrene unit, an α-methylstyrene unit and a combination thereof are the most preferred.

In the random copolymer of the present invention, the sum of the MMA units (A) and the aromatic vinyl compound units (B) is in the range of 49 to 97% by weight based on the copolymer. If the sum of the units (A) and (B) is lower than 49% by weight, the copolymer becomes brittle, while if the sum is more than 97% by weight, the heat distortion resistance and heat decomposition resistance of the copolymer becomes poor.

The methacrylic acid units (C), contained in the copolymer in an amount of 1 to 10% by weight based on the copolymer, contribute mainly to improving the heat distortion resistance of the copolymer. If the proportion of the methacrylic acid units (C) is more than 10% by weight, a gas is generated in the copolymer when the copolymer is subjected to injection molding at 280° C. or more, causing the molded product to be undesirably opaque.

The hexagonal anhydride units (D) of the formula (II) are contained in the random copolymer in an amount of 0 to 48% by weight, preferably 0 to 20% by weight, based on the copolymer.

The hexagonal imide units (E) of the formula (III) are contained in the random copolymer in an amount of 2 to 50% by weight, preferably 4 to 40% by weight, based on the copolymer.

In the formula (III), R preferably represents a hydrogen atom, a methyl group, a cyclohexyl group or a phenyl group.

Both the hexagonal anhydride units (D) and the hexagonal imide units (E) contribute to improving the heat distortion resistance and heat decomposition resistance of the copolymer. However, the hexagonal imide units (E) are more effective. The hexagonal imide units are formed, as mentioned later, by conversion from the hexagonal anhydride units and, hence, the conversion should be effected to such an extent that the prportion of the hexagonal imide units in the random copolymer is in the range as mentioned above.

In the present invention, the sum of the hexagonal anhydride units (D) and the hexagonal imide units (E) is in the range of 2 to 50% by weight based on the copolymer. If the sum of the units (D) and (E) is lower than 2% by weight, the heat distortion resistance and heat decomposition resistance of the copolymer becomes poor. On the other hand, if the sum is more than 50% by weight, the mechanical strength of the copolymer becomes undesirably low and the molding properties of the copolymer become poor, although the heat distortion resistance of the copolymer is greatly improved.

The contents of the respective units (A) to (E) in the random copolymer of the present invention can be determined as follows. The MMA units (A) and the hexagonal anhydride units (D) can be preferably determined by infrared spectrophotometry. The MMA units (A) exhibit a characteristic absorption peak at $1730 cm^{-1}$, while the hexagonal anhydride units (D) exhibit characteristic absorption peaks at $1800 cm^{-1}$ and $1760 cm^{-1}$. With respect to the hexagonal imide units (E), N-substituted imide units exhibit a definite absorption peak at $1670 cm^{-1}$ which is distinguishable from the absorption peak at $1730 cm^{-1}$ ascribed to the MMA units (A), but the absorption peak at $1700 cm^{-1}$ ascribed to N-unsubstituted imide units is not distinct because it is near the large absorption peak at $1730 cm^{-1}$ ascribed to the MMA units (A). Accordingly, the hexagonal imide units (E) are preferably calculated from the content of nitrogen determined by elemental analysis. The methacrylic acid units (C) are preferably determined by neutralization titration. For example, by a rapid titration in acetone with an alcoholic NaOH solution, the methacrylic acid units (C) can be determined without detecting the hexagonal anhydride units (D). For determining the aromatic vinyl compound units (B), infrared spectrophotometry is generally employed. However, $^1H$-NMR or $^{13}C$-NMR is preferably employed for attaining greater precision in measurement.

The molecular weight of the random copolymer of the present invention needs to be within an appropriate range so that the copolymer has good molding properties as well as a high mechanical strength. In the present invention, the molecular weight of the random copolymer is defined by a solution viscosity for the copolymer, which is correlated with the weight-average molecular weight of the copolymer. The random copolymer of the present invention has a reduced viscosity ($0sp/C$) of 0.15 to 2 dl/g as measured at 25° C. with respect to 0.5 dl of a solution of 0.15 g of the random copolymer in chloroform. The measurement is carried out by means of Ostwald capillary viscometer. Preferably, the reduced viscosity ($\eta sp/C$) is in the range of 0.15 to 0.8 dl/g, more preferably in the range of 0.2 to 0.8 dl/g. If the reduced viscosity ($\eta sp/C$) is lower than 0.15 dl/g, the mechanical strength of the random copolymer becomes undesirably low, while if the viscosity is higher than 2 dl/g, the melt-flow properties of the copolymer become poor, leading to difficulties in molding the copolymer.

The random copolymer of the present invention is colorless and transparent as well as having excellent heat distortion resistance, heat decomposition resistance, molding properties, mechanical strength and oil resistance. Further, the water absorption for the random copolymer is low. Due to such excellent properties, the random copolymer can be suitably employed as materials for parts of electric apparatus, e.g. parts of lighting fixture including covers for automobile headlamps, engineering plastics, tableware, optical fiber cables, lenses, optical disc substrates and the like.

In another aspect of the present invention, there is provided a process for preparing a random copolymer comprising:

(A) 29 to 92% by weight, based on the copolymer, of methyl methacrylate units, (B) 5 to 67% by weight, based on the copolymer, of aromatic vinyl compound units of the formula (I)

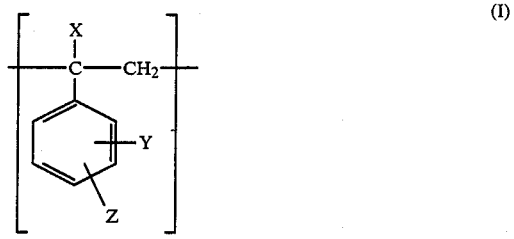

wherein X is selected from the group consisting of a hydrogen atom and a methyl group, and Y and Z are independently selected from the group consisting of a hydrogen atom, an alkyl group having 1 to 4 carbon atoms, and a chlorine atom, (C) 1 to 10% by weight, based on the copolymer, of methacrylic acid units, (D) 0 to 48% by weight, based on the copolymer, of hexagonal anhydride units of the formula (II)

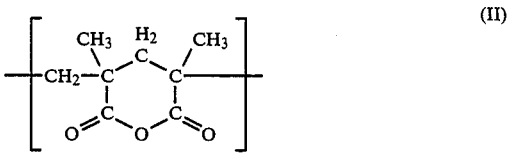

and (E) 2 to 50% by weight, based on the copolymer, of hexagonal imide units of the formula (III)

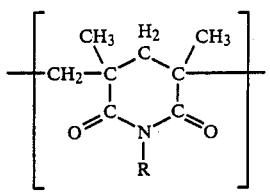

(III)

wherein R is selected from the group consisting of a hydrogen atom and $R^1$ in which $R^1$ is selected from the group consisting of an alkyl group having 1 to 10 carbon atoms, a cycloalkyl group having 5 to 12 carbon atoms, an aralkyl group having 7 to 22 carbon atoms and an aryl group having 6 to 12 carbon atoms, the sum of the units (A) and (B) and the sum of the units (D) and (E) being respectively in the ranges of 49 to 97% by weight and 2 to 50% by weight based on the copolymer, wherein the random copolymer has a reduced viscosity ($\eta$sp/C) of 0.15 to 2 dl/g as measured at 25° C. with respect to 0.5 dl of a solution of 0.15 g of the random copolymer in chloroform, which comprises the steps of:

(i) subjecting a monomer mixture, composed of 27 to 92% by weight, based on the monomer mixture, of methyl methacrylate, 5 to 70% by weight, based on the monomer mixture, of an aromatic vinyl compound of the formula (IV)

(IV)

wherein $X^1$, $Y^1$ and $Z^1$ respectively have the same meanings as X, Y and Z defined above, and 3 to 68% by weight, based on the monomer mixture, of a member selected from methacrylic acid, tert-butyl methacrylate and a combination thereof, to continuous bulk polymerization or continuous solution polymerization, the continuous solution polymerization being effected by adding up to 100 parts by weight, per 100 parts by weight of the monomer mixture, of a solvent to the monomer mixture, thereby to obtain a reaction mixture containing a preliminary copolymer, (ii) heating the reaction mixture at 200° to 300° C. for 10 to 90 minutes under a pressure of 100 Torr or less, thereby to form, in the molecules of the preliminary copolymer, hexagonal anhydride units of the formula (II) defined above, (iii) adding to the resulting reaction product obtained in step (ii) 0.04 to 5 equivalents, relative to the hexagonal anhydride units of the formula (II), of ammonia or a primary amine represented by the formula (V)

(V)

wherein $R^2$ has the same meaning as $R^1$ defined above, followed by kneading at 150° to 300° C. under a pressure of 2 to 100 Kg/cm$^2$, (iv) maintaining the resulting mixutre obtained in step (iii) at a temperature and a pressure in the same ranges as those for the kneading in step (iii), the kneading and maintaining in steps (iii) and (iv) being effected totally for a period of 1 to 30 minutes, and (v) heating the mixture obtained in step (iv) at 200° to 300° C. for 0.1 to 60 minutes under a pressure of 100 Torr or less, thereby converting part or all of the hexagonal anhydride units formed in step (ii) to hexagonal imide units of the formula (III) defined above.

The process of the present invention has an advantage in that the preliminary copolymer can continuously be produced by continuous bulk or solution polymerization. According to the process of the present invention, in the conversion of the preliminary copolymer to the random copolymer having hexagonal imide units, the preliminary copolymer is treated without having been isolated and without contact thereof with air. Therefore, the resultant random copolymer has excellent properties especially in colorlessness and transparency and it is also free from dust particles.

In the practice of the process of the present invention, from a viewpoint of preventing corrosion of the apparatus, all of the parts of the polymerization reaction vessel, tanks and pipings employed for steps (i) through (v) are preferably made of stainless steel or other anti-corrosive materials.

In step (i) of the process of the present invention, a monomer mixture composed of 27 to 92% by weight, based on the monomer mixture, of MMA as a first monomer component, 5 to 70% by weight, based on the monomer mixture, of an aromatic vinyl compound represented by the above-mentioned formula (IV) as a second monomer component and 3 to 68% by weight, based on the monomer mixture, of a member selected from the group consisting of methacrylic acid, t-BMA and a combination thereof as a third monomer component, is subjected to continuous bulk polymerization or continuous solution polymerization.

As the aromatic vinyl compound of the formula (IV), there may be mentioned for example, stryrene, $\alpha$-methylstyrene, p-methylstyrene, 2,4-dimethylstyrene, p-tert-butylstyrene, p-chlorostyrene and combinations thereof. Among the above compounds, styrene, $\alpha$-methyl-styrene and a combination thereof are most preferred.

When a combination of methacrylic acid and t-BMA is employed as the third monomer compound, the ratio of methacrylic acid and t-BMA is not critical.

The polymerization of the monomer mixture may be performed either by continuous bulk polymerization or continuous solution polymerization. However, from a viewpoint of ease in the control of the rate of polymerization and the viscosity of the polymerization system, solution polymerization is preferred in most cases. When $\alpha$-methylstyrene is used as the aromatic vinyl compound, bulk polymerization is preferably employed, since the polymerization rate and the viscosity of the system can be maintained stably within appropriate ranges without any solvent.

When the polymerization is effected by continuous solution polymerization, a solvent is employed in an amount up to 100 parts by weight per 100 parts by weight of the monomer mixture. In most cases, the amount of the solvent is preferably 5 to 100 parts by weight based on the monomer mixture. However, when $\alpha$-methylstyrene is used as the aromatic vinyl compound, a solvent is employed generally in an amount less than 20 parts by weight based on the monomer mixture.

Examples of the solvent include aromatic hydrocarbons such as benzene, toluene, xylene and ethylbenzene; ketones such as acetone, methyl ethyl ketone, methyl isobutyl ketone and cycolhexanone; esters such as methyl isobutyrate; ethers such as ethylene glycol monoethyl ether and tetrahydrofuran; and alcohols such as methyl, ethyl, isopropyl, butyl an cyclohexyl alcohols.

As a polymerization initiator for the monomer mixture, organic peroxides and azo-compounds may be used. Of these, preferred are those whose half-life periods at 60° to 150° C. are about 10 hours. For example, there can be mentioned lauroyl peroxide, benzoyl peroxide, 1,1-bis(t-butylperoxy)3,3,5-trimethylcyclohexane, 1,1-bis(t-butylperoxy)cyclohexane, t-butyl peroxyisopropylcarbonate, t-butyl peroxybenzoate, di-t-butyl peroxide, 2,2'-azobis isobutyronitrile, 1,1'-azobis cyclohexane-1-carbonitrile and 2-cyano-2-propylazoformamide.

As a chain transfer agent for controlling the molecular weight of the preliminary copolymer, there may preferably be employed for example, thiols such as octanethiol and hydrocarbons such as an α-methylstyrene dimer.

A heat stabilizer may be added to the monomer mixture in order that the preliminary copolymer obtained in step (i) may be stable when treated in subsequent step (ii) which is conducted at a high temperature of 200 ° to 300° C. Preferred heat stabilizers include phosphorous ester compounds such as 1,1,3-tris(2-methyl-4-ditridecylphosphite-5-t-butylphenyl)butane, dinonylphenylpentaerythritol diphosphite, tris(2,4-di-t-butylphenyl)phosphite and tris(nonylphenyl)phosphite, and hindered phenol compounds such as 2,6-di-tert-butyl-4-methyl phenol, 4,4-butylidene-bis-( 6-tert-butyl-3-methyl phenol), · n-octadecyl-β-(4-hydroxy-3,5-di-t-butylphenyl)propionate and 1,1,3-tris(2-methyl-4-hydroxy-5-t-butylphenyl)butane.

As the polymerization reaction vessel, a vessel of either a perfect-mixing type or a plug flow type may be employed. As the perfect-mixing type, a vessel type equipped with a stirrer, a tubular high-speed circulation type and the like may be employed.

In step (i), the monomer mixture is continuously supplied to a polymerization vessel, together with a solvent and with the above-mentioned various agents according to need, and polymerized generally at 50° to 180° C. by a conventional polymerization method, thereby to obtain a reaction mixture containing a preliminary copolymer. The preliminary copolymer thus produced may preferably be composed of 27 to 96% by weight, based on the copolymer, of MMA units, 3 to 70% by weight, based on the copolymer, of aromatic vinyl compound units, and 3 to 70% by weight, based on the copolymer, of units derived from methacrylic acid, t-BMA or a combination thereof.

In step (ii), the reaction mixture obtained in step (i) is heated at 200° to 300° C., preferably 240° to 280° C., for 10 to 90 minutes, preferably 30 to 90 minutes, under a pressure of 100 Torr or less, thereby to form, in the molecules of the preliminary copolymer, hexagonal anhydride units of the formula (II) defined above.

The heating of the reaction mixture containing the preliminary copolymer, any monomers remaining unreacted and the solvent if used is generally effected in a devolatilizing vessel. Preferably, before being supplied to the devolatilizing vessel, the reaction mixture obtained in step (i) is heated to 200° to 300° C. by the use of a preheater. In step (ii), in the heat treatment of the reaction mixture for the formation of the hexagonal anhydride units, the solvent if used and any monomers remaining unreacted are devolatilization-removed from the reaction mixture.

The mechanism of the formation of hexagonal anhydride units of the formula (II) is as follows. In the heat treatment of the copolymer, in the case in which the preliminary copolymer has been obtained from MMA, styrene and methacrylic acid, the following two kinds of hexagonal anhydride unit-forming reactions occur: (1) a dehydration reaction between two adjacent methacrylic acid units, and (2) a reaction between a methacrylic acid unit and the adjacent MMA unit being accompanied by the elimination of methanol. In the heat treatment of the copolymer, when the preliminary copolymer has been obtained from MMA, styrene and t-BMA, the following two-stage hexagonal anhydride unit-forming reaction occurs: (3) a reaction in a t-BMA unit being accompanied by the elimination of isobutene and the formation of a methacrylic acid unit and the subsequent reaction of the thus formed methacrylic acid units would occur in the same manner as described with respect to reactions (1) and (2) mentioned above.

The heating of the reaction mixture should be effected under the above-mentioned conditions. In cases wherein the temperature is lower than 200° C., the heating is conducted for a period of less than 10 minutes, or the pressure is higher than 100 Torr, the reaction for forming hexagonal anhydride units of the formula (II) does not sufficiently proceed and, hence, portions of the methacrylic acid units and MMA units to be reacted to form hexagonal anhydride units remain unreacted in the preliminary copolymer. Such remaining units tend to react with each other in the step of molding the final copolymer, resulting in water and methanol being formed in the copolymer, which would cause the molded product to be extremely opaque. On the other hand, if the temperature exceeds 300° C., or if the heating is conducted for a period of more than 90 minutes, the preliminary copolymer undesirably becomes yellowish.

In step (iii), ammonia or a primary amine is added to the reaction product obtained in step (ii), and then they are effectively kneaded.

Generally, the reaction product of step (ii) containing hexagonal anhydride units, is supplied in a molten state through a pipe to a kneader by means of a gear pump or a screw pump. Ammonia or a primary amine is supplied to the kneader generally through another pipe. The amount of the ammonia or primary amine to be added to the reaction product of step (ii) is 0.04 to 5 equivalents, preferably 0.4 to 2 equivalents, relative to the hexagonal anhydride units.

In the process of the present invention, the hexagonal imide units contained in the final random copolymer, is formed from the hexagonal anhydride units contained in the preliminary copolymer. In other words, the hexagonal anhydride units in the preliminary copolymer are converted to the hexagonal imide units. This conversion is performed by the reaction of the anhydride units with ammonia or a primary amine. Hence, the proportion of the hexagonal anhydride units converted to imide units can be controlled by changing the amount of ammonia or a primary amine to be employed in step (iii). In practice, the amount of ammonia or primary amine to be added is decided after determining the amount of the hexagonal anhydride units in the reaction product obtained in step (ii). The amount of the hexagonal anhydride units may be determined by infrared spectrophotometry, and if greater precision is desired, the determination may preferably be conducted by $^{13}$C-NMR. If the amount of ammonia or a primary amine added in step (iii) is less than 0.04 equivalents relative to the hexagonal anhydride units, the proportion of the hexagonal imide units represented by the formula (III) in the final random copolymer becomes less than 2% by weight based on the random copolymer. Such a random copolymer would be deficient in heat distortion resistance. On the other hand, if the amount of ammonia or a primary amine is more than 5 equivalents relative to the hexagonal anhydride units, the final random copolymer would become undesirably yellowish.

The temperature in the kneader is 150° to 300° C., preferably 180 to 230° C., and the pressure is 2 to 100 Kg/cm$^2$. If the pressure is less than 2 Kg/cm$^2$, the kneading cannot be performed effectively.

The ammonia or primary amine to be used in step (iii) can be gaseous or liquid, or in the form of an aqueous solution. The primary amine can also be used in the form of a mixture with a solvent. When the ammonia or primary amine is used in the form of a solution or mixture, the concentration is not particularly limited.

The primary amine to be used in step (iii) is represented by the formula (V)

$$R^2—NH_2 \quad\quad\quad (V)$$

herein R$^2$ stands for an alkyl group having 1 to 10 carbon atoms, a cycloalkyl group having 5 to 12 carbon atoms, an aralkyl group having 7 to 22 carbon atoms or an aryl group having 6 to 12 carbon atoms. As such primary amines, there may be mentioned for example, alkyl- and cycloalkylamines such as methylamine, ethylamine, n-propylamine, isopropylamine, n-butylamine, isobutylamine, sec-butylamine, t-butylamine, n-pentylamine, isopentylamine, 1,2-dimethylpropylamine, hexylamine, cyclohexylamine and octylamine; aralkylamines such as benzylamine, D- or L-α-phenethylamine and β-phenethylamine; and aromaticamines such as aniline, o-toliuidine, 2,4,6-trichloroaniline, 4-nitro-2-toluidine, α-naphthylamine, β-naphthylamine, 2-methoxyaniline, 4-methoxyaniline, 2-ethoxyaniline and 4-ethoxyaniline. Among ammonia and the above-mentioned primary amines, most preferred are ammonia, methylamine, cyclohexylamine and aniline.

In step (iv), the resulting mixture obtained in step (iii) is maintained at a temperature and a pressure in the same ranges as those for the kneading in step (iii), i.e. at 150° to 300° C. and 2 to 100 Kg/cm$^2$.

The kneading in step (iii) and the treatment in step (iv) is effected totally for a period of 1 to 30 minutes.

During steps (iii) and (iv), there occurs addition reaction of ammonia or primary amine to the hexagonal anhydride units in the preliminary copolymer, thereby cleaving the hexagonal anhydride units. Therefore, if the period of the kneading in step (iii) and the treatment in step (iv) is less than one minute, the addition reaction cannot proceed sufficiently. If the period is more than 30 minutes, an undesirable deesterification reaction occurs and the molecular weight of the preliminary copolymer is undesirably lowered.

In step (v), the mixture obtained in step (iv) is heated at 200° to 300° C., preferably 220° to 280° C., for 0.1 to 60 minutes, preferably 5 to 60 minutes, under a pressure of 100 Torr or less.

Generally, the mixture obtained in step (iv) is supplied through a preheater to a devolatilizing vessel, and heated therein under the above conditions, thereby converting part or all of the hexagonal anhydride units, which have been cleaved by the addition of the ammonia or primary amine, to hexagonal imide units of the formula (III) defined above. As mentioned hereinbefore, the proportion of the hexagonal anhydride units converted to hexagonal imide units can be controlled by changing the amount of ammonia or a primary amine employed in step (iii).

If the heating in step (v) is effected at a temperature lower than 200° C., the imidization reaction does not sufficiently proceed; if the temperature is higher than 300° C., the copolymer becomes undesirably yellowish. In case the pressure is higher than 100 Torr, the imidization reaction does not sufficiently proceed, and further the devolatilization of the primary amine or ammonia remaining unreacted becomes insufficient, resulting in undesirable discolored products. Moreover, if the residence time, i.e. heating time, is less than 0.1 minute, the imidization does not effectively proceed; if the residence time exceeds 60 minutes, the final random copolymer becomes undesirably yellowish.

As the devolatilizing vessels generally used in steps (ii) and (v), a tank type and a vent extruder type may be employed. When the residence time of 10 minutes or less is employed, the vent extruder type is preferably used; when the residence time of more than 10 minutes is employed, the tank type is preferred. The tank type devolatilizing vesels include vertical and horizontal tanks with or without a stirrer, all of which are employable in the process of the present invention. However, the preferred is a devolatilizing tank in which the molten polymer moves like plug flow so that the residence time of the molten polymer does not locally vary.

Through the steps (i) to (v), a colorless and transparent random copolymer of the present invention is obtained. The random copolymer thus obtained has excellent heat distortion resistance, heat decomposition resistance and molding properties and has a low water absorption property.

The random copolymer thus obtained, may be subjected to injection molding or extrusion molding. However, if desired, one or more additives may be added to the random copolymer after step (v). As the additives, there may be mentioned for example, heat stabilizers; light stabilizers such as benzotriazole, its derivatives and hindered amines; mold release agents such as nonionic surfactants and anionic surfactants; and lubricants such as a liquid paraffin, a higher fatty acid having 8 to 22 carbon atoms, a metal (calcium, magnesium, zinc or the like) salt of a higher fatty acid having 4 to 22 carbon atoms, ethylene-bis-palmitamide, ethylene-bis-stearamide, stearyl alcohol and other higher aliphatic alcohols, dibutyl or dioctyl ester of adipic or sebacic acid, mono-, di- or triglyceride of a higher fatty acid having 8 to 22 carbon atoms, hydrogenated castor oil., hydrogenated tallow, and dimethyl polysiloxane.

As explained above, according to the process of the present invention, the novel random copolymer having excellent properties can be advantageously produced on a commercial scale.

In Examples 1 to 19 and Comparative Examples 1 to 14, various physical properties of the polymers were measured as follows. (1) Tensile strength was measured according to ASTM-D638.

(2) Flexural strength was measured according to ASTMD-790.

(3) Melt flow index (MFI) was measured according to JIS K 7210 at 230° C. under a load of 3.8 Kg.

(4) Vicat softening temperature was measured according to ASTM-D1525.

(5) Heat distortion temperature was measured according to ASTM-D648 using an unannealed test sample of ¼ inch in thickness.

(6) Heat stability, i.e. heat decomposition resistance, was evaluated in terms of the temperature (5wt %-decrease temperature) at which the weight of a polymer decreases by 5%. While elevating the ambient temperatuee at a rate of 10° C. /min, thermal gravimetrical analysis of a test sample was effected in a nitrogen stream, and the 5wt %-decrease temperature was measured.

(7) Oil resistance was evaluated in terms of the appearance of cracks. A box-shaped injection-molded sample was filled with salad oil and allowed to stand at 40° C. for 24 hours, and then occurrences of cracks on the surfaces of the sample were checked.

(8) Reduced viscosity ($\eta sp/C$) was measured at 25° C. by means of an Ostwald capillary viscometer, with respect to 0.5 dl of a solution of 0.15 g of a test sample in chloroform.

(9) Water absorption in equilibrium was measured by immersing in water a compression-molded sample sheet of 0.6 mm in thickness at 23° C., and after 10-day immersion, the equilibrated water absorption of the sample was determined.

According to a further aspect of the present invention, there is provided a substrate for an optical disc which is made of a random copolymer, comprising:

(A) 29 to 92% by weight, based on the copolymer, of methyl methacrylate units, (B) 5 to 67% by weight, based on the copolymer, of aromatic vinyl compound units of the formula (I)

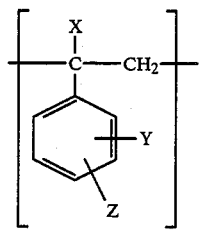

wherein X is selected from the group consisting of a hydrogen atom and a methyl group, and Y and Z are independently selected from the group consisting of a hydrogen atom, an alkyl group having 1 to 4 carbon atoms, and a chlorine atom, (C) 1 to 10% by weight, based on the copolymer, of methacrylic acid units, (D) 0 to 48% by weight, based on the copolymer, of hexagonal anhydride units of the formula (II)

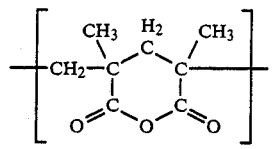

and (E) 2 to 50% by weight, based on the copolymer, of hexagonal imide units of the formula (III)

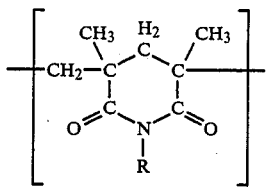

wherein R is selected from the group consisting of a hydrogen atom and $R^1$ in which $R^1$ is selected from the group consisting of an alkyl group having 1 to 10 carbon atoms, a cycloalkyl group having 5 to 12 carbon atoms, an aralkyl group having 7 to 22 carbon atoms and an aryl group having 6 to 12 carbon atoms, the sum of the units (A) and (B) and the sum of the units (D) and (E) being respectively in the ranges of 49 to 97% by weight and 2 to 50% by weight based on the copolymer, wherein the random copolymer has a reduced viscosity ($\eta sp/C$) of 0.15 to 2 dl/g as measured at 25° C. with respect to 0.5 dl of a solution of 0.15 g of the random copolymer in chloroform.

The random copolymer to be used as material for the present substrate for optical discs can be prepared by the method as mentioned hereinbefore.

In the random copolymer for substrates for optical discs, the proportion of the MMA units (A) is 29 to 92% by weight, preferably 40 to 92% by weight, more preferably 50 to 80% by weight, based on the copolymer. If the proportion of MMA units (A) is less than 29% by weight, the double refraction of a laser beam incident on the substrate becomes unfavorably large. If the proportion is more than 92% by weight, the melt-flow properties and other physical properties become poor.

The aromatic vinyl compound units (B) of the formula (I) are contained in the random copolymer in an amount of 5 to 67% by weight, preferably 5 to 56% by weight, based on the copolymer. The aromatic vinyl compound units (B) contribute mainly to improved heat decomposition resistance of the copolymer and to lowered water absorption of the substrate. The improved heat decomposition resistance enables the copolymer to stand higher temperatures, leading to improved flow properties, that is, the copolymer has improved molding properties when it is subjected to being molded into an optical disc substrate. If the proportion of the aromatic vinyl compound units (B) is less than 5% by weight, the heat decomposition resistance becomes poor and the water absorption becomes disadvantageously high. If the proportion is more than 67% by weight, the double refraction of a laser beam incident on the substrate becomes undesirably large.

As the preferred aromatic vinyl compound units (B), there may be mentioned a styrene unit, an α-methylstyrene unit and a combination thereof.

In the random copolymer to be used as a disc substrate of the present invention, the sum of the MMA units (A) and the aromatic vinyl compound units (B) is in the range of 49 to 97% by weight based on the copolymer. If the sum of the units (A) and (B) is less than 49% by weight, the double refraction of a laser beam incident on the substrate becomes undesirably large, while if the sum is more than 97% by weight, the heat distortion resistance of the substrate becomes poor.

The methacrylic acid units (C), contained in the copolymer in an amount of 1 to 10% by weight based on the copolymer, contributes mainly to improving the heat distortion resistance of the substrate. If the proportion of the methacrylic acid units (C) is more than 10% by weight, the water absorption of the substrate becomes undesirably high.

The hexagonal anhydride units (D) of the formula (II) are contained in the random copolymer in an amount of 0 to 48% by weight, preferably 0 to 20% by weight based on the copolymer.

The hexagonal imide units (E) of the formula (III) are contained in the random copolymer in an amount of 2 to 50% by weight, preferably 4 to 40% by weight, based on the copolymer.

In the formula (III), R preferably represents a hydrogen atom, a methyl group, a cyclohexyl group or a phenyl group.

Both the hexagonal anhydride units (D) and the hexagonal imide units (E) contribute to improving the heat distortion resistance and creep resistance of the substrate. However, the hexagonal imide units (E) are more effective. The hexagonal imide units are formed, as mentioned hereinbefore, by conversion from the hexagonal anhydride units and, hence, the conversion should be effected to such an extent that the proportion of the hexagonal imide units in the random copolymer is in the range as mentioned above.

In the present invention, the sum of the hexagonal anhydride units (D) and the hexagonal imide units (E) is in the range of 2 to 50% by weight, preferably 10 to 22.5% by weight, based on the copolymer. If the sum of the units (D) and (E) is less than 2% by weight, the heat distortion resistance of the substrate becomes poor. On the other hand, if the sum is more than 50% by weight, the melt-flow properties of the copolymer become poor.

The contents of the respective units (A) to (E) in the random copolymer for the present substrate can be determined by the methods as mentioned hereinbefore.

The random copolymer for the substrate of the present invention has a reduced viscosity ($\eta$sp/C) of 0.15 to 2 dl/g as measured at 25° C. with respect to 0.5 dl of a solution of 0.15 g of the random copolymer in chloroform. The measurement is carried out by means of an Ostwald capillary viscometer. Preferably, the reduced viscosity ($\eta$sp/C) is in the range of 0.15 to 0.8 dl/g, more preferably in the range of 0.2 to 0.8 dl/g. If the reduced viscosity ($\eta$sp/C) is lower than 0.15 dl/g, the mechanical strength of the substrate becomes low, while if the viscosity is higher than 2 dl/g, the melt-flow properties of the copolymer become poor, so that the moldability of the copolymer into a substrate is poor and the mass-productivity and mold-reappearability of substrates are lowered.

In general, a substrate for an optical disc is required to have a low double refraction index. If the substrate of an optical disc has a high double refraction index, the reflectance of the laser beam which is reflected by the optical disc at the time of playing back the information recorded on the disc by an optical high-density information playback apparatus is lowered, leading to a poor information playback quality. The double refraction index of a substrate for an optical disc is preferably such that the double refraction of a laser beam incident on the substrate is 40 nm or less when the substrate is used for DRAW discs, and 20 nm or less when the substrate is used for E-DRAW discs.

The double refraction of a laser beam incident on a substrate for an optical disc is varied by various factors. With respect to such factors and how these factors affect the double refraction, however, elucidation was not made.

The present inventors have conducted extensive studies with respect to such factors. Particularly, the present inventors have made studies as to the relationship between the composition and molecular weight of the resin to be used for forming the substrate for an optical disc and the double refraction caused by the substrate. As a result, the present inventors have succeeded in developing a resin which satisfies the aforementioned requirements (1) to (10) and can be produced at a reasonable cost.

Besides the composition of the resin to be used for forming the substrate for an optical disc as mentioned above, the method for molding the resin into a substrate also to a considerable degree, affects the double refraction of a laser beam incident on the substrate. As the molding method, various methods may be employed. However, injection molding and, especially, injection compression molding are generally considered to be the most suitable from the viewpoints of productivity, dimensional accuracy, double refraction, etc. of the resulting substrate. When a resin is molded into a substrate for an optical disc (hereinafter often referred to simply as "a substrate") by injection molding, the resin is caused to flow in the mold. As a result, the physical properties, such as optical properties of the resin in the direction of the flow, are caused to be different from those in the direction normal to the direction of the flow. The differences in optical properties include the difference between the refractive index ($n_1$) of the resin in the direction of the flow and that ($n_2$) in the direction normal to the flow. The difference $\Delta n = n_1 - n_2$ is the double refraction index of the resin. The relationship between the double refraction index ($\Delta n$) of the resin and the double refraction (R) of the laser beam incident on the substrate resin is expressed by the following equality $$R = \Delta n \times d$$

wherein d is the thickness of the substrate. It is apparent from the above that when a substrate is produced by injection molding, the double refraction index ($\Delta n$) and the double refraction (R) are increased or decreased depending on the molding conditions. The injection molding conditions include the type of injection molding machine, molding temperature, (cylinder temperature, mold temperature, etc.), design of the mold, (gate design, diameter and length of the runner) and the like. All these conditions are believed to affect the double refraction. However, among the molding conditions mentioned above, the molding temperature is considered as having the most affect on the double refraction characteristics of the resultant substrate and based thereon, the present inventors have made studies on the relationship between the molding temperature and the double refraction characteristics of the substrate. As a result, it has been found that the higher the molding temperature, the lower the double refraction. However, the molding temperature is limited due to other factors. That is, the cylinder temperature should be below the heat decomposition temperature of the resin and the mold temperature should be below the heat distortion temperature of the resin.

The effect of the molding temperature on the double refraction may be seen from the following example. A random copolymer comprising MMA units, styrene units, methacrylic acid units, hexagonal anhydride units and hexagonal imide units in the weight ratios of 65%, 20%, 4%, 2% and 9%, respectively, and having a reduced viscosity ($\eta$sp/C) of 0.5 dl/g as measured at 25° C. with respect to 0.5 dl of a solution of 0.15 g of the random copolymer in chloroform was subjected to molding using an in-line type injection molding machine, Dynameltor M70A.D (manufactured and sold by Meiki Seisakusho, Japan), to obtain a substrate having a diameter of 127 mm and a thickness of 1.2 mm. The cylinder temperature employed was 300° C. and a mold temperature was 70° C. The double refraction (R) of a laser beam incident on the substrate was 17 nm. Another substrate was prepared in substantially the same manner as mentioned above, except that the cylinder temperature was changed to 320° C. The double refraction (R) for the latter substrate was 12 nm.

In using the random copolymer to prepare a substrate for an optical disc, it is preferable to incorporate into the random copolymer a hindered phenol compound in an amount of 100 to 10,000 ppm because the addition of the compound suppresses the formation of gases in the copolymer during the molding. The term "hindered phenol compound" as used herein is intended to mean a phenol compound having a bulky substituent group at at least one of the two ortho-positions.

As a preferred example of the hindered phenol compound, there may be mentioned a phenol compound having a moleculer weight of 350 or more and represented by the following general formula

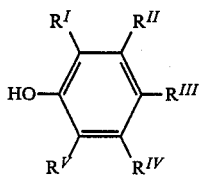

wherein $R^I$ and $R^{II}$ independently represent a hydrogen atom or an alkyl group, $R^{III}$ represents an organic substituent group, $R^{IV}$ represents a hydrogen atom and $R^V$ represents a t-butyl group. As the organic substituent group $R^{III}$, there may be mentioned as a preferable example, an organic substituent group containing therein one or more hindered phenol structures.

Specific examples of the hindered phenol compound are given below:
pentaerithrityl-tetrakis[3-(3,5-di-t-butyl-4-hydroxyphenyl)propionate] (molecular weight:1176.6),
1,1,3-tris(2-methyl-4-hydroxy-5-t-butylphenyl)-butane (molecular weight:544.83),
n-octadecyl-3-(4'-hydroxy-3',5'-di-t-butylphenyl)propionate (molecular weight:520.9),
tris(3,5-di-t-butyl-4-hydroxybenzyl)isocyanurate (molecular weight:712),
triethylene glycol bis-3-(3-t-butyl-4-hydroxy-5-methylphenyl)propionate (molecular weight:586.8),
4,4'-butylidene-bis(3-methyl-6-t-butylphenol) (molecular weight:382.6),
tris[$\beta$-(3,5-di-t-butyl-4-hydroxyphenyl)propionyloxyethyl]isocyanurate (molecular weight:1045),
4,4'-methylene-bis(2,6-di-t-butyl)phenol (molecular weight:425),
1,3,5-tri-methyl-2,4,6-tris(3,5-di-t-butyl-4-hydroxybenzyl)benzene (molecular weight:761.1),
hexamethylene glycol bis($\beta$-3,5-di-t-butyl-4-hydroxyphenyl)propionate (molecular weight:524.8) and
bis[3,3-bis(4'-hydroxy-3'-t-butylphenyl)butylic acid]-glycol ester (molecular wight:795).

Additives such as a lubricant and an antistatic agent may optionally be added to the resin to be used for forming a substrate as long as the additive used does not impair the transparency and any other physical properties of the resin.

DETAILED DESCRIPTION OF THE DRAWINGS

A brief explanation is given below on the structure and function of an optical disc in which the substrate of the present invention is used with reference to the accompanying drawing. In FIG. 1, a diagrammatic cross-sectional view illustrating the reading operation of an example of the optical disc as mentioned above is shown. In FIG. 1, reference numerals 1 and 2 respectively indicate a substrate made of the above-mentioned copolymer resin and a reflecting layer formed on substrate 1 by, for example, vacuum evaporation of a metal. Reference numeral 3 indicates a pit which has been formed by a method as mentioned below. In general, pit 3 has a width of about 0.4 to 0.6 $\mu$m, a depth of 0.1 to 0.2 $\mu$m and a length which is usually distributed, for example, in the range of from 1 $\mu$m or in the range of from 1.6 $\mu$m according to the type of the optical disc. Pits 3 are closely arranged along a track which has an eddy as viewed from the top. Laser beam 5 is focused, by means of a lens 4, to a point on reflecting layer 2 through substrate 1. Laser beam 5 incident on the point of reflecting layer 2 is reflected by the reflecting layer and returns to a detector (not shown) through lens 4. When the optical disc is rotated while applying the laser beam onto reflecting layer 2 through lens 4, laser beam 5 is caused to hit on pits 3 in sequence according to the arrangement of the pits 3. Therefore, the reflection of laser beam 5 is varied in accordance with the arrangement of pits 3 and, hence, the intensity of laser beam returns to the detector through lens 4 is varied. Thus, the information recorded on the optical disc in the form of pits is detected in the form of a variation in the intensity of the laser beam returning to the detector. The thus detected signals are converted into electrical signals and then played back as sound or the like.

The optical disc as described above may be produced as follows. First, the above-mentioned random copolymer resin is subjected to molding, such as injection molding, using a stamper to obtain a substrate having on one side thereof fine pits. Then, a reflecting layer is formed on the substrate over its side having pits. The reflecting layer may suitably be formed by vacuum evaporation of a metal. As the metal to be used for forming a reflecting layer, there may be mentioned aluminum, gold, platinum, silver, copper and the like. Of these metals, aluminum is preferred from a viewpoint of cost.

Figure 2:
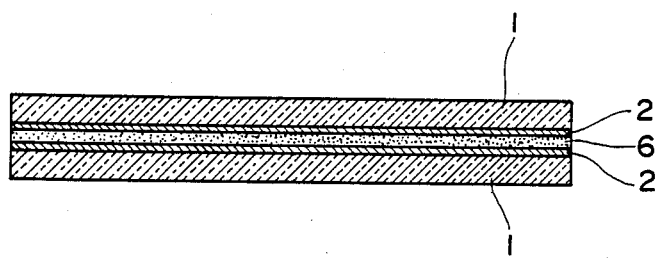
FIG. 2 is a diagrammatic cross-sectional view of one form of an optical disc in which the random copolymer of the present invention is used as a material of the substrate and both the front and back sides can be used for information recording.

In FIG. 2, there is shown a diagrammatic cross-sectional view of an optical disc made of two pieces of disc elements each comprising substrate 1 having on its one surface pits and a reflecting layer formed on the surface of the substrate and having a pattern in accordance with the pits. The reflecting layer functions as information recording layer 2. Such an optical disc may be prepared by laminating the above-mentioned two disc elements each having on one of its side an information recording layer. In the optical disc, the two information recording layers 2, 2 are disposed in an opposite relationship and are attached to each other by means of adhesive 6 as shown in FIG. 2.

In the optical disc of the type as described above, the substrate have pits formed using a stamper for the substrate at the time of molding. Alternaively, pits which serve to record information can be formed by laminating a sensitive layer (pore-opening recording layer) onto a substrate and subjecting the sensitive layer to irradiation with a laser beam in accordance with a predetermined pattern to form holes in the sensitive layer. Still alternatively, information can be recorded by laminating a sensitive layer (phase-changing recording layer) onto the substrate and subjecting the sensitive layer to irradiation with a laser beam to change the magnetic direction of the sensitive layer in accordance with a predetermined pattern. As a pore-opening recording layer, there may be mentioned for example, a layer comprising an oxide of Te-C, As-Te-Se or the like. As a phase-changing recording layer, there may be mentioned for example, a layer comprising an oxide of Sb-Se/Bi-Te, Sn-Te-Se or the like. The phase-changing recording layer can be used for E-DRAW discs.

The resin to be used for forming the substrate according to the present invention satisfies the requirements with respect to optical and physical properties as summarized below.

| Optical properties | |
|---|---|
| Transmittance of a laser beam having a wave length of 630 nm or 840 nm (resin thickness: 2.5 to 3.0 mm) | 90% or more |
| Double refraction | 40 nm or less, preferably 20 nm or less |
| Refractive index | 1.5 ± 0.1 |
| Contaminants | Absent |
| Physical characteristics | |
| Heat distortion temperature | 110 ° C. or more |
| Susceptibility for vacuum evaporation of aluminum | Good |
| Adhesion to recording layer | Good |
| Moldability | Good |
| Dimensional accuracy and stability | |
| Thickness distribution | ±0.1 mm |
| Warp (after 72 hrs at 45 ° C., 90% RH) | 0.4 mm or less |

The optical and physical properties as indicated above and in Examples 20 to 25 and Comparative Examples 15 to 23 which will be presented later were evaluated as follows.

[1] Double refraction (the following items (1), (2) and (3) correspond to items (1), (2) and (3) in Table 2 which will be given later.):

(1) Double refraction before storage: A substrate for an E-DRAW disc having no pits thereon (diameter; 127 mm, thickness; 1.2 mm) is prepared by molding. The disc is subjected to measurement of the double refraction in terms of retardation of He-Ne laser beam after double passes through the substrate by the Sénarmont compensator method using a polarization microscope, XTP-11 (manufactured and sold by Nippon Kogaku K.K., Japan). The criteria are as follows.
O 20 nm or less (standard for E-DRAW discs)
Δ40 nm or less (standard for DRAW discs)
×: more than 40 nm (2) Double refraction after storage: The above-mentioned double refraction measurement is effected after allowing the disc to stand at 60° to 70° C. for 7 days.
O: Double refraction increase is within 1%.
×: Double refraction increase is more than 20%.

(3) Dependency of double refraction on the angle of the incident He-Ne laser beam:
O: The double refraction is not dependent on the angle of the incident laser beam.
×: The double refraction greatly increases depending on deviation in the angle of the incident laser beam from the angle normal to the surface of the substrate.

[2] Heat resistance:
The heat resistance is evaluated in terms of heat distortion temperature. The heat distortion temperature (° C.) is determined in accordance with JIS K 7207 under a load of 18.6 kg/cm$^2$. The criteria are as follows.
O: 110° C. or more
Δ: 100° C. or more
×: less than 100° C.

[3] Transparency (Transmittance of a laser beam):
The transmittance (%) of a laser beam is determined in accordance with JIS K 6718 (method A) using an intergrating-sphere photometer.
O: 90% or more
×: less than 90%

[4] Mold-reappearability:
An optical disc is prepared using a substrate which has been produced by molding using of a stamper having a single audio signal of 500 kilocycle formed thereon by cutting. Then, the optical disc is played back and $I_3$-p.p. signals are picked up. The accuracy in transfer of the signal is evaluated in terms of height, width and shape of the peaks of the $I_3$-p.p. signals. The criteria are as follows.
O: The height, width and shape of the peaks are constant.
×: The height and width of the peaks are varied and the shape of the peaks are distorted.

[5] Oxygen permeability:
The oxygen permeability [cc(STP)cm/cm$^2$.sec.cmHg] is determined using an oxygen permeability meter for films (Seikaken type, manufactured and sold by Rika Seiki K.K., Japan).
O: $10^{-12}$[cc(STP)cm/cm$^2$.sec.cmHg] or less
×: more than $10^{-10}$[cc(STP)cm/cm$^2$.sec.cmHg]

[6] Hardness (resistance to scratching):
The surface hardness (resistance to scratching) is evaluated in terms of hardness of a pencil which can make scratches on a substrate.
O: HB or harder ×: softer than HB

[7] Adhesion to recording layers:

A recording layer of Al, Te-Gd or Fe-Co is formed on a substrate by vacuum evaporation and the resultant disc is subjected to a environmental test at 65° C. under 90% RH for 1000 hrs to examine the adhesion between the recording layer and the substrate. The criteria are as follows.

O: Good adhesion is maintained.

×: Adhesion is deteriorated by corrosion of the recording layer.

[8] Contaminants:

1 g of resin of a substrate is dissolved in 250 ml of 1,2-dichloroethane and the number of the contaminants having a diameter of 10–25 μm and contained in the solution are determined using a particle counter for liquids (Model 4100, manufactured and sold by HIAC/ROYCO Instruments Division, U.S.A.). The criteria are as follows.

O: less than 200

×: 200 or more

[9] Deterioration of recording layer:

A recording layer of Al, Te-Gd or Fe-Co is formed on a substrate by vacuum evaporation and the resultant disc is subjected to an environmental test at 65° C. under 90% RH for 1000 hrs to examine the deterioration of the recording layer due to the polymerization solvent remaining unremoved in the substrate. The criteria are as follows.

O: Not deteriorated

×: Deteriorated

[10] Productivity (moldability):

The criteria are as follows.

O: In the substrates produced by molding, the ratio of defective products (contaminated with foreign matters produced by burning during the molding or by wearing of the screw, etc.) is very low.

X: In the substrates produced by molding, the ratio of defective products as described above is high.

[11] Warp:

An optical disc is prepared by forming a pit-shaving substrate having a diameter of 12 cm and a thickness of 1.2 to 1.5 mm and then applying to one surface thereof an aluminum film and further a UV coating. The thus prepared optical disc is put on a plate and allowed to stand at 45° C. under 90% RH for 72 hours. Then, the warp (mm) of the disc is measured. The criteria are as follows.

O: less than 0.4 mm

×: 0.4 mm or more

DETAILED DESCRIPTION OF THE PREFERRED EMBODIMENTS

This invention will now be described in detail with reference to the following Examples and comparative Examples but they should not be construed to be limiting the scope of the present invention. In the Examples and Comparative Examples, all of "parts" and "% (percent)" are given on a weight basis unless otherwise indicated.

EXAMPLE 1

A monomer solution was obtained by mixing 42.9 parts of styrene, 10.6 parts of methacrylic acid (MAA), 46.5 parts of methyl methacrylate (MMA) as monomers and 25 parts of ethylbenzene as a solvent. To 100 parts of the monomer solution were added 0.003 part of 1,1-di-t-butylperoxy-3,3,5-trimethylcyclohexane, 0.15 part of octanethiol, 0.01 part of 1,1,3-tris(2-methyl-4-ditridecylphosphite-5-t-butylphenyl)-butane and 0.1 part of n-octadecyl-β-(4-hydroxy-3,5-di-t-butylphenyl)-propionate, thereby to prepare a mixture. The methyl methacrylate employed as one of the monomers had contained no polymerization inhibitor. The ethylbenzene employed as the solvent had been treated with activated alumina to remove impurities. Then, a nitrogen gas was bubbled into the above-mentioned mixture to remove the oxygen dissolved in the mixture. Through a first filter with a pore diameter of 3 μm and then a second filter with a pore diameter of 0.2 μm, the mixture was continuously supplied at a flow rate of 3.2 /l hr to a 8-liter perfect-mixing vessel made of stainless steel, followed by polymerization at 140° C.

After completion of the polymerization, the reaction product was sampled and the sample was dried under reduced pressure. As a result, it was found that the reaction product had a solid content of 40%. The reaction product was continuously taken out of the polymerization vessel, and subsequently supplied to a 30-liter devolatilizing tank through a pipe in which the reaction product was preheated to 270° C. In the tank, the temperature was maintained at 260° C. and the pressure was held constant at a pressure of 30 Torr. The reaction product supplied to the tank was allowed to stay therein for 30 minutes to devolatilization-remove the solvent and the monomers remaining unreacted, thereby to obtain a molten polymer. Then, the molten polymer was subjected to imidization as follows. That is, the molten polymer was continuously taken out from the bottom of the tank by means of a gear pump, and supplied to a kneader through a pipe. Separately, 28% ammonia water was continuously poured into the kneader through another pipe at a flow rate of 100 g/hr. The molten polymer and ammonia water were mixed in the kneader at 230° C. under a pressure of 23 Kg/cm². Then, the mixture in the kneader was continuously transferred through a pipe to a single-stage screw extruder having a 25-mm screw and a vent hole. Before supplied to the extruder, the mixture was retained in the kneader and a withdrawing pipe for 5 minutes totally, and then preheated to 270° C. The temperature of the inside of the extruder was maintained at 270° C., and the pressure of the vent area was reduced to and maintained at 15 Torr. The mixture was retained in the extruder for 0.5 minutes to be converted into a final polymer, and then the final polymer was extruded to obtain a colorless and transparent polymer resin. The composition and physical properties of the polymer resin are shown in Table 1.

EXAMPLES 2 AND 3

Polymerization and the subsequent treatments of the polymer were effected in substantially the same manner as in Example 1 except that the proportions of the three monomers were varied as shown in Table 1. The compositions and physical properties of the polymer resins as obtained are shown in Table 1.

EXAMPLE 4

Polymerization was effected in substantially the same manner as in Example 1 except that a monomer solution was obtained by mixing 10 parts of styrene, 37 parts of MAA, 53 parts of MMA as monomers and 67 parts of methyl ethyl ketone as a solvent. After completion of the polymerization, the reaction product was continuously taken out of the polymerization vessel, and subsequently supplied to a 30-liter first devolatilizing tank. The temperature and pressure in the tank were maintained at 260° C. under 30 Torr. The reaction product supplied to the tank was allowed to stay therein for 50 minutes to obtain a molten polymer. The molten polymer was continuously taken out of the tank and supplied to a kneader. Separately, 28% ammonia water was continuously poured into the kneader at a flow rate of 300 g/hr, and mixed with the molten polymer at 220° C. under a pressure of 37 Kg/cm² for 10 minutes. The mixture in the kneader was continuously transferred to a 30-liter second devolatilizing tank in which the temperature and pressure were maintained at 270° C. under 30 Torr, and allowed to stay therein for 30 minutes, thereby to obtain a colorless and transparent polymer resin. The composition and physical properties of the polymer resin are shown in Table 1.

EXAMPLES 5 TO 7

Substantially the same procedures as in Example 4 were repeated except that, in place of the 28% ammonia water in Example 4, equivalent amounts of primary amines were employed. Specifically, a 40% aqueous methylamine was used in Example 5, cyclohexylamine in Example 6, and aniline in Example 7. The compositions and physical properties of te obtained polymer resins are shown in Table 1.

COMPARATIVE EXAMPLE 1

Substantially the same procedures as in Example 7 were repeated except that the proportions of the three monomers were varied as shown in Table 1, thereby to obtain a polymer resin. The composition and physical properties of the resin are shown in Table 1.

COMPARATIVE EXAMPLE 2

Polymerization and the subsequent treatment were effected in substantially the same manner as in Example 1 except that a monomer solution for polymerization was prepared by mixing 60 parts of tert-butyl methacrylate (t-BMA) and 40 parts of methyl ethyl ketone, thereby to obtain a polymer. Subsequently, the polymer thus formed was taken out without being subjected to imidization. The composition and physical properties of the obtained polymer resin are shown in Table 1.

COMPARATIVE EXAMPLES 3 AND 4

Polymerization and the subsequent treatment were effected in substantially the same manner as in Comparative Example 2. Then, the polymer thus obtained was subjected to imidization treatment in substantially the same manner as in Example 1 except that, in place of the 28% ammonia water in Example 1, equivalent amounts of aniline and 40% aqueous methylamine solution were respectively used in Comparative Examples 3 and 4, thereby to obtain polymer resins. The compositions and physical properties of the resins are shown in Table 1.

COMPARATIVE EXAMPLE 5

Polymerization and the subsequent treatment were effected in substantially the same manner as in Example 2. Subsequently, the thus formed polymer was taken out without being subjected to imidization. The composition and physical properties of the obtained polymer resin are shown in Table 1.

EXAMPLES 8 TO 10

Polymerization and the subsequent treatment were effected in substantially the same manner as in Comparative Example 5. Then, the polymers thus obtained were subjected to imidization treatment in substantially the same manner as in Example 1 except that ammonia were used in amounts of 0.4, 0.6 and 1.0 equivalents relative to the hexagonal anhydride units in the polymers, respectively in Examples 8, 9 and 10, thereby to obtain polymer resins. The compositions and physical properties of the resins are shown in Table 1.

EXAMPLE 11 AND COMPARATIVE EXAMPLES 6 TO 9

Substantially the same procedures as in Example 1 were repeated except that the compositions of monomer solutions were varied as indicated in Table 1, thereby to obtain polymer resins. The compositions and physical properties of the resins are shown in Table 1.

COMPARATIVE EXAMPLE 10

For comparison, a polystyrene resin having a weight average molecular weight of 285,000 and a MFI at 230° C. under 3.8 Kg load of 9.4 g/10min was tested. The physical properties are shown in Table 1.

COMPARATIVE EXAMPLE 11

For comparison, a PMMA resin consisting of 97.5 wt % of MMA units and 2.5 wt % of methyl acrylate units and having a MFI at 230° C. under 3.8 Kg load of 2.0 g/10min was tested. The physical properties are shown in Table 1.

COMPARATIVE EXAMPLE 12

Polymerization and the subsequent treatment were effected in substantially the same manner as in Example 1 except that a monomer solution for polymerization was prepared by mixing 29.8 parts of styrene, 70.2 parts of MMA as monomers and 25 parts of ethylbenzene as a solvent, thereby to obtain a polymer. Subsequently, the polymer thus formed was taken out without being subjected to imidization. The composition and physical properties of the obtained polymer resin are shown in Table 1.

COMPARATIVE EXAMPLE 13

Polymerization and the subsequent treatment were effected in substantially the same manner as in Example 1 except that a monomer solution for polymerization was prepared by mixing 94 parts of styrene, 6 parts of methacrylic acid (MAA) as monomers and 25 parts of ethylbenzene as a solvent, thereby to obtain a polymer. Subsequently, the thus formed polymer was taken out without being subjected to imidization. The composition and physical properties of the obtained polymer resin are shown in Table 1.

EXAMPLES 12 TO 17 AND COMPARATIVE EXAMPLE 14

Polymerization and the subsequent treatment were effected in substantially the same manner as in Example 1 except that the compositions of monomer solutions for polymerization were as shown in Table 1 and that the imidization was effected using methylamine in an amount equivalent to the ammonia water in Example 1, thereby to obtain polymers. The compositions and physical properties of the obtained polymer resins are shown in Table 1.

EXAMPLE 18 AND 19

Polymerization, the subsequent treatment and imidization were effected in substantially the same manner as in Example 1 except that the compositions of monomer solutions for the polymerization were as shown in Table 1, thereby to obtain polymer resins. The compositions and physical properties of the obtained polymer resins are shown in Table 1.

TABLE 1

| | Composition of monomer solution (parts) | | | | | | | Composition of Polymer (wt %) | | | | | |
|---|---|---|---|---|---|---|---|---|---|---|---|---|---|
| | Monomer | | | | Solvent | | Ammonia | Sty- | α-Methyl- | | | Hexa-gonal | Hexa- |
| | Sty-rene | α-Methyl-styrene | MAA | t-BMA | MMA | Ethyl-ben-zene | MEK | or Primary amine | rene unit | Sty-rene unit | MAA unit | MMA unit | anhy-dride unit | gonal imide unit |
| Example 1 | 42.9 | — | 10.6 | — | 46.5 | 25 | — | aq. ammonia | 44 | — | 6 | 40 | — | 10 |
| Example 2 | 14 | — | 10.6 | — | 75.4 | " | — | aq. ammonia | 15 | — | 4 | 70 | — | 11 |
| Example 3 | 31.3 | — | 25 | — | 43.7 | " | — | aq. ammonia | 35 | — | 7.5 | 32.5 | — | 25 |
| Example 4 | 10 | — | 37 | — | 53 | — | 67 | aq. ammonia | 10 | — | 6 | 51 | — | 33 |
| Example 5 | " | — | " | — | " | — | " | aq. methyl-amine | 10 | — | 5 | 49 | — | 36 |
| Example 6 | " | — | " | — | " | — | " | cyclo-hexyl-amine | 9 | — | 4 | 43 | 20 | 24 |
| Example 7 | " | — | " | — | " | — | " | aniline | 9 | — | 5 | 43 | 1 | 42 |
| Comparative example 1 | 10 | — | 47 | — | 43 | — | " | " | 9 | — | 6 | 33 | 1 | 51 |
| Comparative example 2 | — | — | — | 100 | — | — | " | — | — | — | — | — | 100 | — |
| Comparative example 3 | — | — | — | 100 | — | — | " | aniline | — | — | — | — | 2 | 98 |
| Comparative example 4 | — | — | — | 100 | — | — | " | aq. methyl-amine | — | — | — | — | — | 100 |
| Comparative example 5 | 14 | — | 10.6 | — | 75.4 | 25 | — | — | 15 | — | 4 | 70 | 11 | — |
| Example 8 | " | — | " | — | " | " | — | aq. ammonia | " | — | " | " | 8 | 3 |
| Example 9 | " | — | " | — | " | " | — | aq. ammonia | " | — | " | " | 6 | 5 |
| Example 10 | " | — | " | — | " | " | — | aq. ammonia | " | — | " | " | 1 | 10 |
| Comparative example 6 | 2 | — | 11.2 | — | 86.8 | — | 25 | aq. ammonia | 3 | — | 3 | 82 | — | 12 |
| Comparative example 7 | 70 | — | " | — | 18.8 | 25 | — | aq. ammonia | 72 | — | 8 | 16 | — | 4 |
| Comparative example 8 | 58.8 | — | " | — | 30 | " | — | aq. ammonia | 60 | — | 7 | 25 | — | 8 |
| Example 11 | 48.8 | — | " | — | 40 | " | — | aq. ammonia | 51 | — | 5 | 34 | — | 10 |
| Comparative example 9 | — | — | 3.5 | — | 96.5 | — | 25 | aq. ammonia | — | — | 1.2 | 95.5 | — | 3.7 |
| Comparative example 10 | — | — | — | — | — | — | — | — | 100 | — | — | — | — | — |
| Comparative example 11 | — | — | — | — | — | — | — | — | — | — | — | 97.5 MA 2.5 | — | — |
| Comparative example 12 | 29.8 | — | — | — | 70.2 | 25 | — | — | 35 | — | — | 65 | — | — |
| Comparative example 13 | 94 | — | 6 | — | — | " | — | — | 92 | — | 8 | — | — | — |
| Example 12 | 20 | 15 | 4 | — | 61 | 5 | — | aq. methylamine | 22 | 12 | 1.5 | 60 | — | 4.5 |
| Example 13 | — | 15 | 4 | — | 81 | " | — | aq. methylamine | — | 10 | 1.0 | 82 | — | 7 |
| Example 14 | 25 | 25 | 7.5 | — | 42.5 | " | — | aq. meth- | 28 | 20 | 3 | 42 | — | 7 |

TABLE 1-continued

| | | | | | | | | | | | | | |
|---|---|---|---|---|---|---|---|---|---|---|---|---|---|
| Example 15 | — | 25 | 7.5 | — | 67.5 | — | — | aq. methylamine | — | 18 | 2.5 | 68 | — | 11.5 |
| Example 16 | 20 | 30 | 10 | — | 40 | — | — | aq. methylamine | 23 | 25 | 4 | 40 | — | 8 |
| Example 17 | — | 30 | 10 | — | 60 | — | — | aq. methylamine | — | 25 | 3 | 59 | — | 13 |
| Comparative example 14 | 20 | 40 | 15 | — | 25 | — | — | aq. methylamine | 25 | 31 | 5 | 22 | — | 17 |
| Example 18 | 26.9 | — | — | 35.5 | 37.6 | 25 | — | aq. ammonia | 34 | — | 6 | 35 | — | 25 |
| Example 19 | 28.9 | — | 11.7 | 18.9 | 40.5 | 25 | — | aq. ammonia | 34 | — | 6.5 | 34 | — | 25.5 |

| | Mechanical strength | | Melt-flow properties | Heat distortion resistance | | Heat stability | Oil resistance | Reduced viscosity | Water absorption in equilibrium at 23° C. (wt. %) |
|---|---|---|---|---|---|---|---|---|---|
| | Tensile strength (Kg/cm$^2$) | Flexural strength (Kg/cm$^2$) | MFI (g/10 min.) | Vicat softening temp. (°C.) | Heat distortion temp. (°C.) | 5 wt % Decrease temperature (°C.) | | [ηsp/C] (dl/g) | |
| Example 1 | 790 | 1200 | 2.0 | 134 | 110 | 400 | Good | 0.39 | 1.9 |
| Example 2 | 800 | 1370 | 1.1 | 142 | 116 | 390 | " | 0.35 | 2.5 |
| Example 3 | 900 | 1390 | 0.9 | 152 | 127 | 390 | " | 0.34 | 2.9 |
| Example 4 | 810 | 1250 | 0.6 | 167 | 138 | 375 | " | 0.33 | 3.1 |
| Example 5 | 800 | 1300 | 0.8 | 145 | 120 | 382 | " | 0.31 | 1.7 |
| Example 6 | 810 | 1230 | 0.7 | 150 | 124 | 372 | " | 0.32 | 1.9 |
| Example 7 | 820 | 1290 | 0.6 | 169 | 140 | 379 | " | 0.33 | 1.9 |
| Comparative example 1 | 610 | 790 | 0.3 | 181 | 151 | 371 | " | 0.33 | 2.3 |
| Comparative example 2 | 820 | 1330 | 0.1 | 166 | 146 | 410 | " | 0.61 | dissolved in water |
| Comparative example 3 | 500 | 690 | below 0.1 | 248 | above 200 | 390 | " | 0.42 | 4.0 |
| Comparative example 4 | 510 | 800 | below 0.1 | 190 | 171 | 389 | " | 0.39 | 4.4 |
| Comparative example 5 | 800 | 1240 | 2.5 | 128 | 104 | 391 | " | 0.53 | 1.8 |
| Example 8 | 800 | 1280 | 2.0 | 132 | 107 | 388 | " | 0.42 | 1.9 |
| Example 9 | 810 | 1300 | 1.7 | 134 | 109 | 391 | " | 0.40 | 2.1 |
| Example 10 | 800 | 1370 | 1.2 | 141 | 115 | 390 | " | 0.39 | 2.4 |
| Comparative example 6 | 790 | 1280 | 0.3 | 144 | 117 | 381 | " | 0.42 | 3.0 |
| Comparative example 7 | 580 | 900 | 4.1 | 130 | 103 | 369 | Poor | 0.51 | 1.1 |
| Comparative example 8 | 620 | 950 | 2.8 | 130 | 105 | 378 | Good | 0.43 | 1.3 |
| Example 11 | 720 | 1210 | 1.9 | 134 | 109 | 390 | " | 0.46 | 1.9 |
| Comparative example 9 | 800 | 1310 | 0.4 | 132 | 103 | 358 | " | 0.43 | 2.9 |
| Comparative example 10 | 580 | 960 | 9.4 | 107 | 87 | 360 | Poor | 0.60 | below 0.1 |
| Comparative example 11 | 720 | 1250 | 2.0 | 118 | 92 | 345 | Good | 0.54 | 2.0 |
| Comparative example 12 | 760 | 1190 | 4.0 | 112 | 90 | 360 | " | 0.64 | 0.8 |
| Comparative example 13 | 560 | 830 | 5.2 | 125 | 100 | 360 | Poor | 0.61 | 0.4 |
| Example 12 | 710 | 1160 | 1.5 | 130 | 105 | 375 | — | 0.52 | 0.5 |
| Example 13 | 720 | 1180 | 0.8 | 142 | 113 | 379 | — | 0.48 | 1.3 |
| Example 14 | 700 | 1100 | 0.6 | 140 | 116 | 381 | — | 0.53 | 0.6 |
| Example 15 | 700 | 1100 | 0.5 | 149 | 120 | 378 | — | 0.39 | 1.3 |
| Example 16 | 730 | 1110 | 0.9 | 144 | 120 | 375 | — | 0.31 | 1.0 |
| Example 17 | 700 | 1000 | 0.5 | 152 | 125 | 371 | — | 0.25 | 1.6 |
| Comparative example 14 | 550 | 760 | 0.5 | 163 | 135 | 370 | — | 0.13 | 1.1 |
| Example 18 | 850 | 1200 | 1.0 | 150 | 125 | 390 | Good | 0.37 | 2.8 |

TABLE 1-continued

| Example 19 | 790 | 1210 | 1.2 | 151 | 124 | 385 | " | 0.33 | 2.8 |

EXAMPLE 20

14 Parts of styrene, 15 parts of methacrylic acid, 71 parts of methyl methacrylate, 20 parts of ethylbenzene and 0.1 part of octanethiol were mixed to prepare a liquid reactant mixture. The thus prepared mixture was supplied continuously at a rate of 0.5 /hr to a perfect-mixing reaction vessel equipped with a jacket and having an internal volume of 2 liters to effect polymerization. As a polymerization initiator, 1,1-di-tert-butyl-peroxy-3,3,5-trimethylcyclohexane was used, and the polymerization temperature was 110° C. The resulting polymerization reaction mixture containing a copolymer in an amount of 42% was continuously supplied to a tank and heated at 270° C. for 30 min under a pressure of 30 Torr to devolatilization-remove the solvent and the monomers remaining unreacted and to form hexagonal anhydride units in the copolymer, thereby obtaining a reaction product. The composition of the reaction product was determined by neutralization titration and by infrared spectrophotometry. As a result, it was found that the copolymer thus obtained consisted of 15% of styrene units, 65% of methyl methacrylate units, 4% of methacrylic acid units and 16% of hexagonal anhydride units.

The above-obtained copolymer was then transferred in a molten state, by means of a gear pump provided on the bottom of the tank, to a kneader through a pipe. At the same time, 28% aqueous ammonia was supplied to the kneader through another pipe in an amount of 0.4 equivalent relative to the hexagonal anhydride units of the copolymer, followed by kneading at 230° C. under a pressure of 11 Kg/cm$^2$. After the mixture was retained in the kneader and a withdrawing pipe for 30 min at 230° C. and 11 Kg/cm$^2$, the mixture was preheated to 270° C. and supplied to a single-stage screw extruder having a 25-mm screw and a vent hole to effect extrusion. The extruder was kept at 265° C. and the pressure of the vent zone was reduced to 18 Torr. The average residence time of the mixture in the extruder was 2 min. The resultant ultimate copolymer product, which was colorless and transparent, was analyzed using an infrared spectrophotometer. As a result, there were observed absorptions at 1800 cm$^{-1}$ and 1760 cm$^{-1}$, which are characteristic of hexagonal anhydride units, and absorption at 1700 cm$^{-1}$, which indicates that hexagonal imide units were formed. The nitrogen content of the ultimate copolymer product was determined by elementary analysis, and from the nitrogen content, the amount of hexagonal imide units contained in the product was calculated and found to be 3%. The ultimate copolymer product had a reduced viscosity ($\eta$sp/C) of 0.4 dl/g as measured at 25° C. with respect to 0.5 dl of a solution of 0.15 g of the copolymer product in chloroform.

The suitability of the above-mentioned copolymer product as a substrate for an optical disc was evaluated. The results are summarized in Table 2 presented later.

EXAMPLES 21 TO 25

Copolymer products having respective compositions as indicated in Table 2 were prepared in substantially the same manner as in Example 20 except that the compositions of monomer mixtures were varied. The suitabilities of the prepared copolymer products as a substrate for an optical disc were evaluated. The results are summarized in Table 2 given later.

COMPARATIVE EXAMPLES 15 AND 16

A polycarbonate resin (Panlite AD 5503, manufactured and sold by Teijin Ltd., Japan) and PMMA (Delpet 98A, manufactured and sold by Asahi Kasei Kogyo K.K., Japan) were subjected to measurements of the same physical properties as measured in Example 20. The results are summarized in Table 2 presented later.

COMPARATIVE EXAMPLES 17 TO 20, AND 23

Copolymer products having respective compositions as indicated in Table 2 were prepared. The prepared copolymer products were subjected to measurements of the same physical properties as measured in Example 20. The results are summarized in Table 2.

COMPARATIVE EXAMPLE 21

A glass (code No. 0317 manufactured and sold by Corning Glass Works Ltd.) was subjected to measurement of the same physical properties as measured in Example 20. The results are summarized in Table 2.

COMPARATIVE EXAMPLE 22

Polystyrene (Styron 666, manufactured and sold by Asahi Kasei Kogyo K.K., Japan) was subjected to measurement of the same physical properties as measured in Example 20. The results are summarized in Table 2.

TABLE 2

| | Composition of Polymer (wt %) | | | | | | | viscosity | Reduced Double refraction | | | Heat |
| | Styrene unit | α-Methyl-styrene unit | MMA unit | MAA unit | Hexagonal anhydride unit | Hexagonal imide unit | t-BMA unit | [ηsp/C] (dl/g) | (1) | (2) | (3) | resistance |
| --- | --- | --- | --- | --- | --- | --- | --- | --- | --- | --- | --- | --- |
| Example 20 | 15 | 0 | 65 | 4 | 13 | 3 | 0 | 0.4 | O | O | O | O |
| Example 21 | 0 | 15 | 65 | 10 | 5 | 5 | 0 | 0.3 | O | O | O | O |
| Example 22 | 7.5 | 7.5 | 60 | 10 | 5 | 10 | 0 | 0.4 | O | O | O | O |
| Example 23 | 15 | 0 | 65 | 5 | 3 | 12 | 0 | 0.5 | O | O | O | O |
| Example 24 | 15 | 0 | 65 | 3 | 1 | 16 | 0 | 0.4 | O | O | O | O |
| Example 25 | 25 | 0 | 60 | 4 | 1 | 10 | 0 | 0.5 | O | O | O | O |
| Comparative example 15 | | | Polycarbonate | | | | | 0.4 | X | X | X | O |
| Comparative example 16 | 0 | 0 | 100 | 0 | 0 | 0 | 0 | 0.5 | O | O | O | X |
| Comparative example 17 | 50 | 0 | 50 | 0 | 0 | 0 | 0 | 0.4 | X | — | — | X |
| Comparative example 18 | 30 | 0 | 50 | 0 | 0 | 0 | 20 | 0.3 | X | — | — | X |

TABLE 2-continued

| | | | | | | | | | | | | |
|---|---|---|---|---|---|---|---|---|---|---|---|---|
| Comparative example 19 | 20 | 0 | 60 | 2 | 5 | 0 | 13 | 0.4 | X | — | — | X |
| Comparative example 20 | 90 | 0 | 0 | 10 | 0 | 0 | 0 | 0.4 | X | — | — | X |
| Comparative example 21 | | | Glass | | | | | — | O | O | O | O |
| Comparative example 22 | 100 | 0 | 0 | 0 | 0 | 0 | 0 | 0.6 | X | — | — | X |
| Comparative example 23 | 2 | 0 | 78 | 5 | 5 | 10 | 0 | 0.4 | O | O | O | O |

| | Transparency | Oxygen permeability | Mold-reappear-ability | Hardness | Productivity | Adhesion to recording layer | Deterioration of recording layer | Warp |
|---|---|---|---|---|---|---|---|---|
| Example 20 | O | O | O | O | O | O | O | O |
| Example 21 | O | O | O | O | O | O | O | O |
| Example 22 | O | O | O | O | O | O | O | O |
| Example 23 | O | O | O | O | O | O | O | O |
| Example 24 | O | O | O | O | O | O | O | O |
| Example 25 | O | O | O | O | O | O | O | O |
| Comparative example 15 | X | X | X | X | X | X | X | O |
| Comparative example 16 | O | O | O | O | O | O | O | X |
| Comparative example 17 | O | O | O | O | O | O | O | O |
| Comparative example 18 | O | O | O | O | O | O | O | O |
| Comparative example 19 | O | O | O | O | O | O | O | O |
| Comparative example 20 | X | X | — | X | — | — | — | O |
| Comparative example 21 | O | O | X | O | X | O | O | O |
| Comparative example 22 | X | X | — | X | — | — | — | O |
| Comparative example 23 | O | O | O | O | X | O | O | X |

What is claimed is:

1. A random copolymer comprising:
(A) 29 to 92% by weight, based on the copolymer, of methyl methacrylate units,
(B) 5 to 67% by weight, based on the copolymer, of aromatic vinyl compound units of the formula (I)

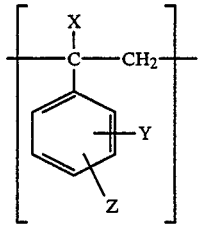

(I)

wherein X is selected from the group consisting of a hydrogen atom and a methyl group, and Y and Z are independently selected from the group consisting of a hydrogen atom, an alkyl group having 1 to 4 carbon atoms, and a chlorine atom,
(C) 1 to 10% by weight, based on the copolymer, of methacrylic acid units,
(D) 0 to 48% by weight, based on the copolymer, of hexagonal anhydride units of the formula (II)

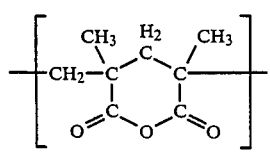

(II)

and
(E) 2 to 50% by weight, based on the copolymer, of hexagonal imide units of the formula (III)

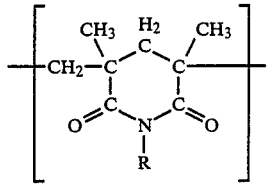

(III)

wherein R is selected from the group consisting of a hydrogen atom and $R^1$ in which $R^1$ is selected from the group consisting of an alkyl group having 1 to 10 carbon atoms, a cycloalkyl group having 5 to 12 carbon atoms, an aralkyl group having 7 to 22 carbon atoms and an aryl group having 6 to 12 carbon atoms,
the sum of said units (A) and (B) and the sum of said units (D) and (E) being respectively in the ranges of 49 to 97% by weight and 2 to 50% by weight based on the copolymer,
wherein the random copolymer has a reduced viscosity ($\eta sp/C$) of 0.15 to 2 dl/g as measured at 25° C. with respect to 0.5 dl of a solution of 0.15 g of the random copolymer in chloroform.

2. The random copolymer according to claim 1, wherein the proportion of said methyl methacrylate units (A) is in the range of 29 to 85% by weight based on the copolymer.

3. The random copolymer according to claim 1, wherein the proportion of said aromatic vinyl compound units (B) of the formula (I) is in the range of 5 to 56% by weight based on the copolymer.

4. The random copolymer according to claim 1, wherein said aromatic vinyl compound units (B) are units selected from the group of styrene units, α-methylstyrene units, and a combination thereof.

5. The random copolymer according to claim 1, wherein the proportion of said hexagonal anhydride units (D) of the formula (II) is in the range of 0 to 20% by weight based on the copolymer.

6. The random copolymer according to claim 1, wherein the proportion of said hexagonal imide units (E) of the formula (III) is in the range of 4 to 40% by weight based on the copolymer.

7. The random copolymer according to claim 1, wherein R in the formula (III) representing said hexagonal imide units (E) is a hydrogen atom, a methyl group, a cyclohexyl group or a phenyl group.

8. The random copolymer according to claim 1, wherein the reduced viscosity ($\eta sp/C$) is in the range of 0.15 to 0.8 dl/g.

9. The random copolymer according to claim 1, wherein said reduced viscosity ($\eta sp/C$) is in the range of 0.2 to 0.8 dl/g.

10. A substrate for an optical disc which is made of a random copolymer, comprising:
(A) 29 to 92% by weight, based on the copolymer, of methyl methacrylate units,
(B) 5 to 67% by weight, based on the copolymer, of aromatic vinyl compound units of the formula (I)

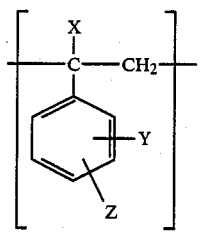

(I)

wherein X is selected from the group consisting of a hydrogen atom and a methyl group, and Y and Z are independently selected from the group consisting of a hydrogen atom, an alkyl group having 1 to 4 carbon atoms, and a chlorine atom,
(C) 1 to 10% by weight, based on the copolymer, of methacrylic acid units,
(D) 0 to 48% by weight, based on the copolymer, of hexagonal anhydride units of the formula (II)

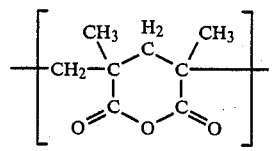

(II)

and (E) 2 to 50% by weight, based on the copolymer, of hexagonal imide units of the formula (III)

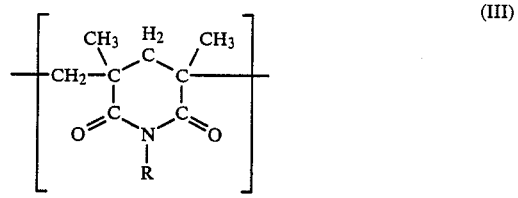

(III)

wherein R is selected from the group consisting of a hydrogen atom and $R^1$ in which $R^1$ is selected from the group consisting of an alkyl group having 1 to 10 carbon atoms, a cycloalkyl group having 5 to 12 carbon atoms, an aralkyl group having 7 to 22 carbon atoms and an aryl group having 6 to 12 carbon atoms, the sum of said units (A) and (B) and the sum of said units (D) and (E) being respectively in the ranges of 49 to 97% by weight and 2 to 50% by weight based on the copolymer, wherein the random copolymer has a reduced viscosity ($\eta sp/C$) of 0.15 to 2 dl/g as measured at 25° C. with respect to 0.5 dl of a solution of 0.15 g of the random copolymer in chloroform.

11. The substrate according to claim 10, wherein the proportion of said methyl methacrylate units (A) is in the range of 50 to 80% by weight based on the copolymer.

12. The substrate according to claim 10, wherein the proportion of said aromatic vinyl compound units (B) of the formula (I) is in the range of 5 to 56% by weight based on the copolymer.

13. The substrate according to claim 10, wherein said aromatic vinyl compound units (B) are units selected from the group of styrene units, α-methylstyrene units, and a combination thereof.

14. The substrate according to claim 10, wherein the proportion of said hexagonal anhydride units (D) of the formula (II) is in the range of 0 to 20% by weight based on the copolymer.

15. The substrate according to claim 10, wherein the proportion of said hexagonal imide units (E) of the formula (III) is in the range of 4 to 40% by weight based on the copolymer.

16. The substrate according to claim 10, wherein R in the formula (III) representing said hexagonal imide units (E) is a hydrogen atom, a methyl group, a cyclohexyl group or a phenyl group.

17. The substrate according to claim 10, wherein the sum of said units (D) and (E) is in the range of 10 to 22.5% by weight based on the total weight of the copolymer.

18. The substrate according to claim 10, wherein the reduced viscosity ($\eta sp/C$) is in the range of 0.15 to 0.8 dl/g.

19. The substrate according to claim 10, wherein the reduced viscosity ($\eta sp/C$) is in the range of 0.2 to 0.8 dl/g.

* * * * *